US012572297B2

(12) United States Patent
Gu et al.

(10) Patent No.: US 12,572,297 B2
(45) Date of Patent: Mar. 10, 2026

(54) METHOD, DEVICE, AND COMPUTER PROGRAM PRODUCT FOR REPLICATING DATA

(71) Applicant: Dell Products L.P., Round Rock, TX (US)

(72) Inventors: Yuan Gu, Beijing (CN); Tianfang Xiong, Shanghai (CN); Chun Ma, Beijing (CN); Yan Shao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/755,087

(22) Filed: Jun. 26, 2024

(65) Prior Publication Data

US 2025/0208782 A1 Jun. 26, 2025

(30) Foreign Application Priority Data

Dec. 22, 2023 (CN) .......................... 202311791570.2

(51) Int. Cl.
*G06F 3/06* (2006.01)

(52) U.S. Cl.
CPC .............. *G06F 3/065* (2013.01); *G06F 3/061* (2013.01); *G06F 3/0673* (2013.01)

(58) Field of Classification Search
CPC ......... G06F 3/065; G06F 3/061; G06F 3/0673
USPC ....................................................... 711/162
See application file for complete search history.

(56) References Cited

U.S. PATENT DOCUMENTS

| | | | |
|---|---|---|---|
| 10,997,072 B1 | 5/2021 | Meiri et al. | |
| 11,151,048 B2 | 10/2021 | Kamran et al. | |
| 11,481,291 B2 | 10/2022 | Kamran et al. | |
| 11,625,169 B2 | 4/2023 | Chen et al. | |
| 11,687,245 B2 | 6/2023 | Shveidel et al. | |
| 12,066,937 B2 * | 8/2024 | Zhang ................. | G06F 12/0802 |
| 12,111,771 B2 * | 10/2024 | Xiang ................... | G06F 3/0611 |
| 2015/0286438 A1 * | 10/2015 | Simionescu ........ | G06F 12/0888 711/103 |
| 2021/0034463 A1 | 2/2021 | Doddaiah et al. | |
| 2022/0027059 A1 * | 1/2022 | Chen ..................... | G06F 3/0689 |

* cited by examiner

*Primary Examiner* — Than Nguyen
(74) *Attorney, Agent, or Firm* — BainwoodHuang

(57) ABSTRACT

Techniques involve: receiving, by a destination device, first input/output (I/O) requests from a source device, the first I/O requests having first logical block addresses (LBAs); writing data in the first I/O requests to a cache of the destination device; flushing the data from the cache to a storage disk of the destination device; recording a particular LBA in the destination device, the particular LBA corresponding to the last LBA to which the destination device is flushed; and sending the particular LBA from the destination device to the source device to enable clearing of journals before the particular LBA in the source device. Such techniques reduce the time spent on replicating data from the source device to the destination device to improve the user experience and reduce the wear and tear of the journal log disk in the destination device to prolong its service life.

20 Claims, 14 Drawing Sheets

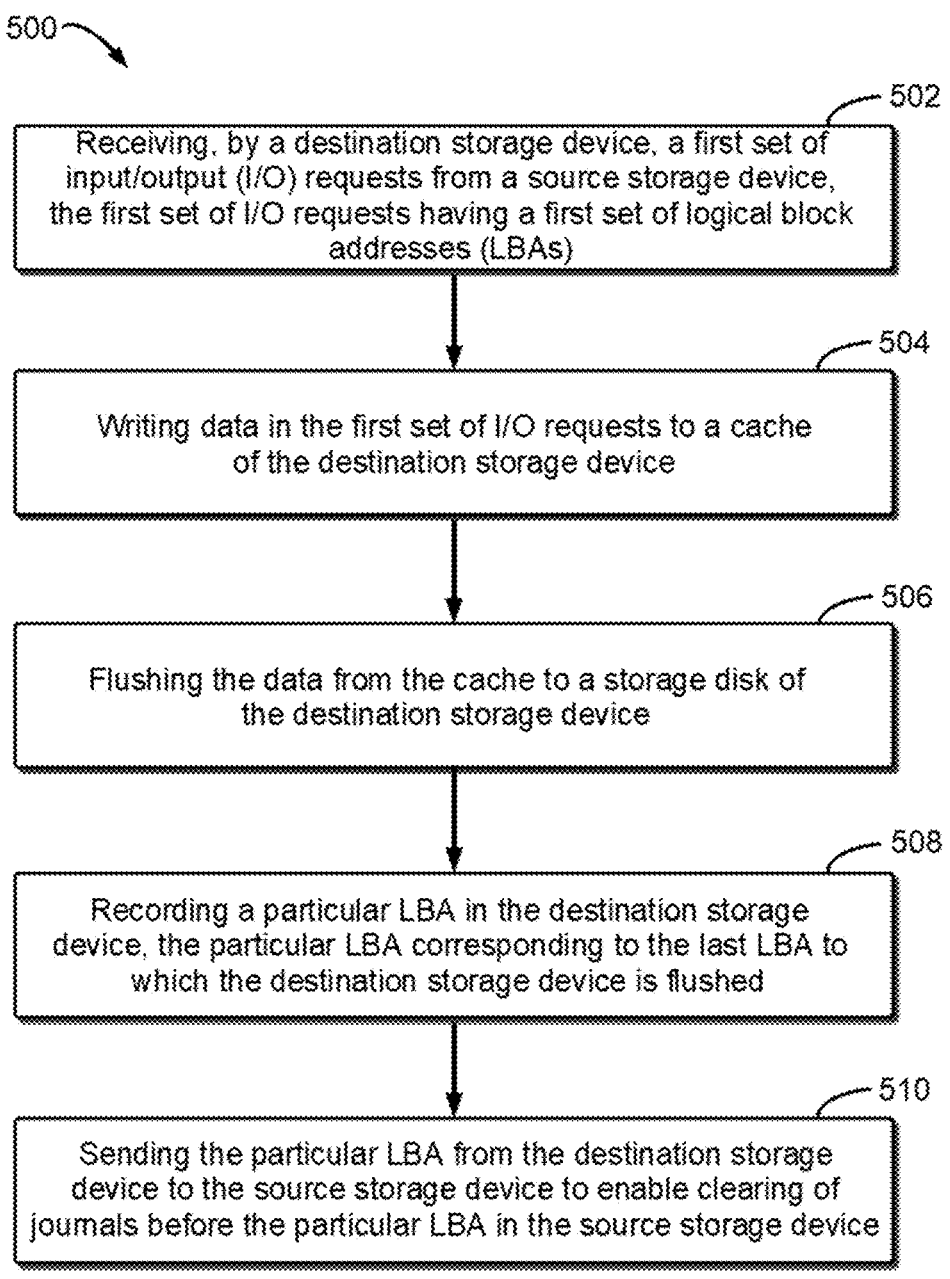

500

502
Receiving, by a destination storage device, a first set of input/output (I/O) requests from a source storage device, the first set of I/O requests having a first set of logical block addresses (LBAs)

504
Writing data in the first set of I/O requests to a cache of the destination storage device 506
Flushing the data from the cache to a storage disk of the destination storage device 508
Recording a particular LBA in the destination storage device, the particular LBA corresponding to the last LBA to which the destination storage device is flushed 510
Sending the particular LBA from the destination storage device to the source storage device to enable clearing of journals before the particular LBA in the source storage device

FIG. 5

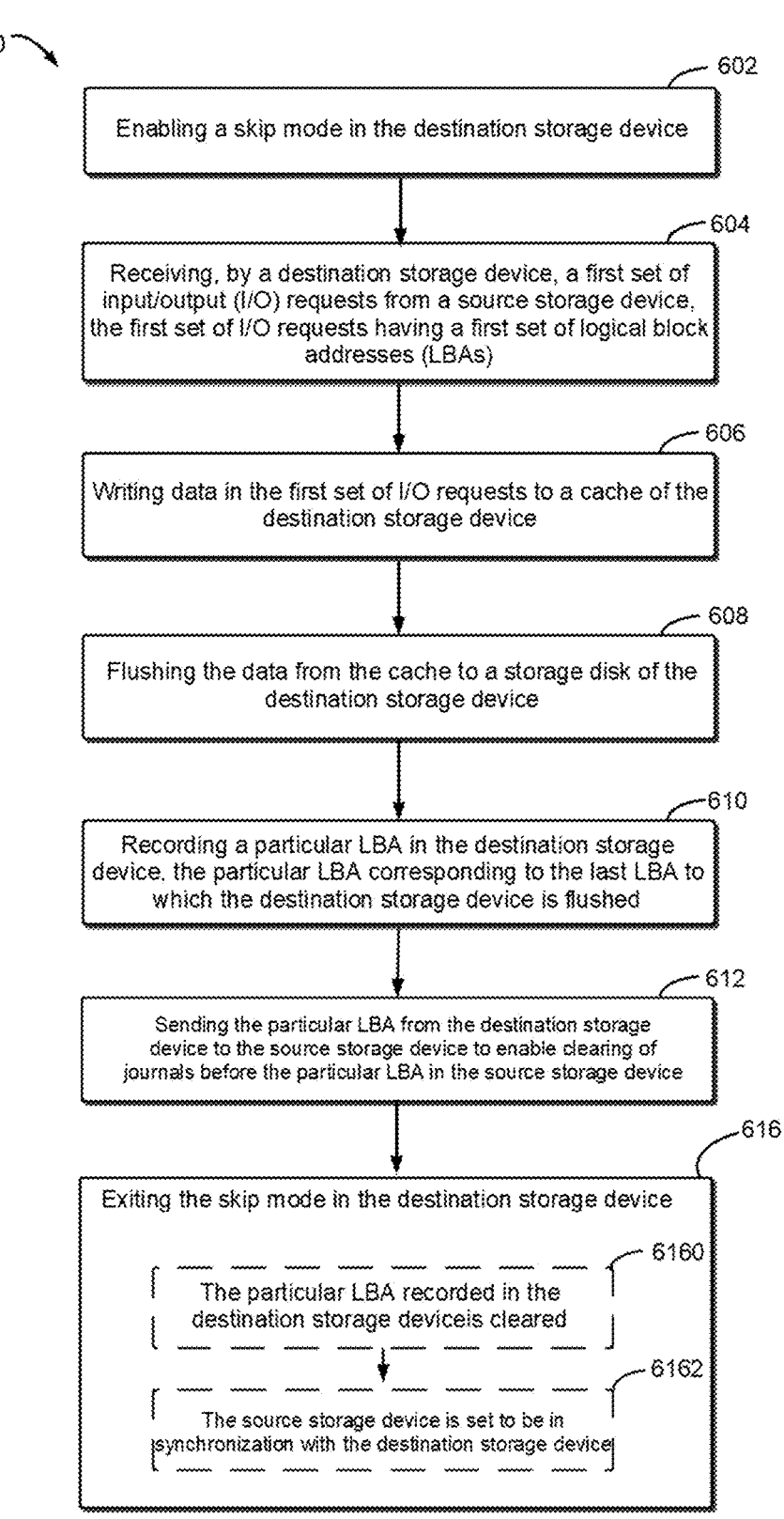

600

602

Enabling a skip mode in the destination storage device

604

Receiving, by a destination storage device, a first set of input/output (I/O) requests from a source storage device, the first set of I/O requests having a first set of logical block addresses (LBAs)

606

Writing data in the first set of I/O requests to a cache of the destination storage device

608

Flushing the data from the cache to a storage disk of the destination storage device

610

Recording a particular LBA in the destination storage device, the particular LBA corresponding to the last LBA to which the destination storage device is flushed

612

Sending the particular LBA from the destination storage device to the source storage device to enable clearing of journals before the particular LBA in the source storage device

616

Exiting the skip mode in the destination storage device

6160

The particular LBA recorded in the destination storage device is cleared

6162

The source storage device is set to be in synchronization with the destination storage device

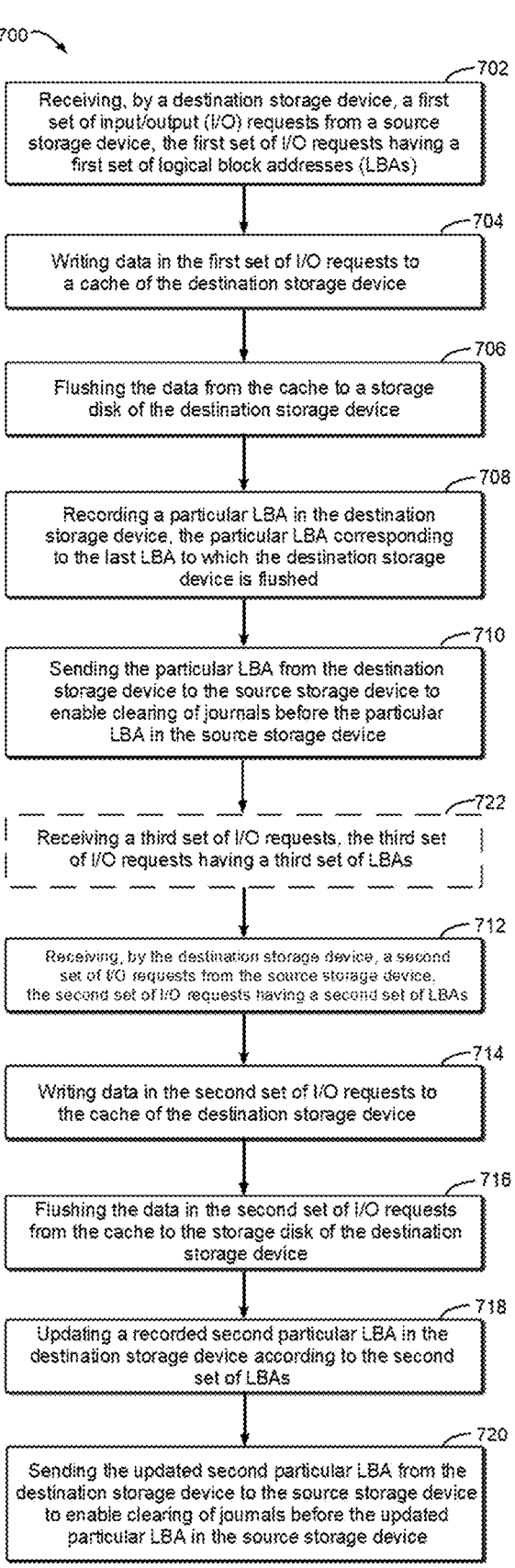

702

Receiving, by a destination storage device, a first set of input/output (I/O) requests from a source storage device, the first set of I/O requests having a first set of logical block addresses (LBAs)

704

Writing data in the first set of I/O requests to a cache of the destination storage device

706

Flushing the data from the cache to a storage disk of the destination storage device

708

Recording a particular LBA in the destination storage device, the particular LBA corresponding to the last LBA to which the destination storage device is flushed

710

Sending the particular LBA from the destination storage device to the source storage device to enable clearing of journals before the particular LBA in the source storage device

722

Receiving a third set of I/O requests, the third set of I/O requests having a third set of LBAs

712

Receiving, by the destination storage device, a second set of I/O requests from the source storage device, the second set of I/O requests having a second set of LBAs

714

Writing data in the second set of I/O requests to the cache of the destination storage device

716

Flushing the data in the second set of I/O requests from the cache to the storage disk of the destination storage device

718

Updating a recorded second particular LBA in the destination storage device according to the second set of LBAs

720

Sending the updated second particular LBA from the destination storage device to the source storage device to enable clearing of journals before the updated particular LBA in the source storage device

FIG. 7

METHOD, DEVICE, AND COMPUTER PROGRAM PRODUCT FOR REPLICATING DATA

CROSS-REFERENCE TO RELATED APPLICATION

This application claims priority to Chinese Patent Application No. CN202311791570.2, on file at the China National Intellectual Property Administration (CNIPA), having a filing date of Dec. 22, 2023, and having "METHOD, APPARATUS AND COMPUTER PROGRAM PRODUCTS FOR REPLICATING DATA" as a title, the contents and teachings of which are herein incorporated by reference in their entirety.

TECHNICAL FIELD

The present disclosure relates to the field of data storage and, more specifically, to a method, a device, and a computer program product for replicating data.

BACKGROUND

A data replication process involves transmitting I/O requests from a host (e.g., an application program) to a source storage device and transmitting the I/O requests from the source storage device to a destination storage device via a fiber channel. The source storage device and the destination storage device are typically in different geographic locations, and the I/O requests are transmitted via the fiber channel between them. The I/O request includes data to be transmitted and a logical block address (LBA), where the LBA is used to describe the address of a logical block or data block on the disk of a storage device. A logical block is the smallest addressable unit on the disk, which corresponds to a physical location on the disk and is typically of 512 bytes.

However, due to the long distance between the source storage device and the destination storage device and the limited fiber transmission rate, the replication of data from the source storage device to the destination storage device may take a long time. For example, replication of 1 PB of data from the source storage device to the destination storage device, even with a fiber channel rate of 10 GB/s, still takes 27 hours to complete the data transmission. Moreover, for a storage device architecture, the fiber channel rate is merely the theoretical maximum bandwidth. In fact, due to various additional overheads caused by the architecture, hardware, and software implementations, the actual transmission rate will be much smaller than the fiber channel rate, which greatly increases the time for data replication or data migration, thus degrading the user experience. Therefore, it is desired to reduce the time for data replication between the source storage device and the destination storage device.

SUMMARY OF THE INVENTION

Embodiments of the present disclosure provide a method, a device, and a computer program product for replicating data. In embodiments of the present disclosure, a destination storage device can receive a first set of input/output (I/O) requests from a source storage device, the first set of I/O requests having a first set of logical block addresses (LBAs); write data in the first set of I/O requests to a cache of the destination storage device; flush the data from the cache to a storage disk of the destination storage device; and record a particular LBA in the destination storage device, the particular LBA corresponding to the last LBA to which the destination storage device is flushed; and then send the particular LBA from the destination storage device to the source storage device to enable clearing of journals before the particular LBA in the source storage device. In this way, in the destination storage device, the data in the I/O requests can be kept from being written to and cleared from the journal log disk, thereby making it possible to reduce the time spent on replicating data from the source storage device to the destination storage device to improve the user experience, and at the same time, making it possible to reduce the wear and tear of the journal log disk in the destination storage device to prolong its service life.

In one aspect of the present disclosure, a method for replicating data is provided. The method includes: receiving, by a destination storage device, a first set of input/output (I/O) requests from a source storage device, the first set of I/O requests having a first set of logical block addresses (LBAs); writing data in the first set of I/O requests to a cache of the destination storage device; flushing the data from the cache to a storage disk of the destination storage device; recording a particular LBA in the destination storage device, the particular LBA corresponding to the last LBA to which the destination storage device is flushed; and sending the particular LBA from the destination storage device to the source storage device to enable clearing of journals, e.g., fracture logs, before the particular LBA in the source storage device.

In another aspect of the present disclosure, an electronic device is provided. The electronic device includes at least one processor and a storage apparatus, wherein the storage device is coupled to the at least one processor and has instructions stored thereon. The instructions, when executed by the at least one processor, cause the electronic device to perform the following actions: receiving, by a destination storage device, a first set of input/output (I/O) requests from a source storage device, the first set of I/O requests having a first set of logical block addresses (LBAs); writing data in the first set of I/O requests to a cache of the destination storage device; flushing the data from the cache to a storage disk of the destination storage device; recording a particular LBA in the destination storage device, the particular LBA corresponding to the last LBA to which the destination storage device is flushed; and sending the particular LBA from the destination storage device to the source storage device to enable clearing of journals before the particular LBA in the source storage device.

In yet another aspect of the present disclosure, a computer program product is provided. The computer program product is tangibly stored on a non-volatile computer-readable medium and includes machine-executable instructions. The machine-executable instructions, when executed, cause a machine to perform actions including: receiving, by a destination storage device, a first set of input/output (I/O) requests from a source storage device, the first set of I/O requests having a first set of logical block addresses (LBAs); writing data in the first set of I/O requests to a cache of the destination storage device; flushing the data from the cache to a storage disk of the destination storage device; recording a particular LBA in the destination storage device, the particular LBA corresponding to the last LBA to which the destination storage device is flushed; and sending the particular LBA from the destination storage device to the source storage device to enable clearing of journals before the particular LBA in the source storage device.

It should be understood that the content described in the section of Summary of the Invention is neither intended to limit key or essential features of the embodiments of the present disclosure, nor intended to limit the scope of the present disclosure. Other features of the present disclosure will become readily understood from the following description.

BRIEF DESCRIPTION OF THE DRAWINGS

The above and other features, advantages, and aspects of the embodiments of the present disclosure will become more apparent with reference to the accompanying drawings and the following detailed description. In the accompanying drawings, identical or similar reference numerals represent identical or similar elements, in which:

FIG. 5 illustrates a flow chart of a method for replicating data of a plurality of embodiments of the present disclosure;

FIG. 6 illustrates a flow chart of another method for replicating data of a plurality of embodiments of the present disclosure;

FIG. 7 illustrates a flow chart of yet another method for replicating data of a plurality of embodiments of the present disclosure;

DETAILED DESCRIPTION

Figure 1:
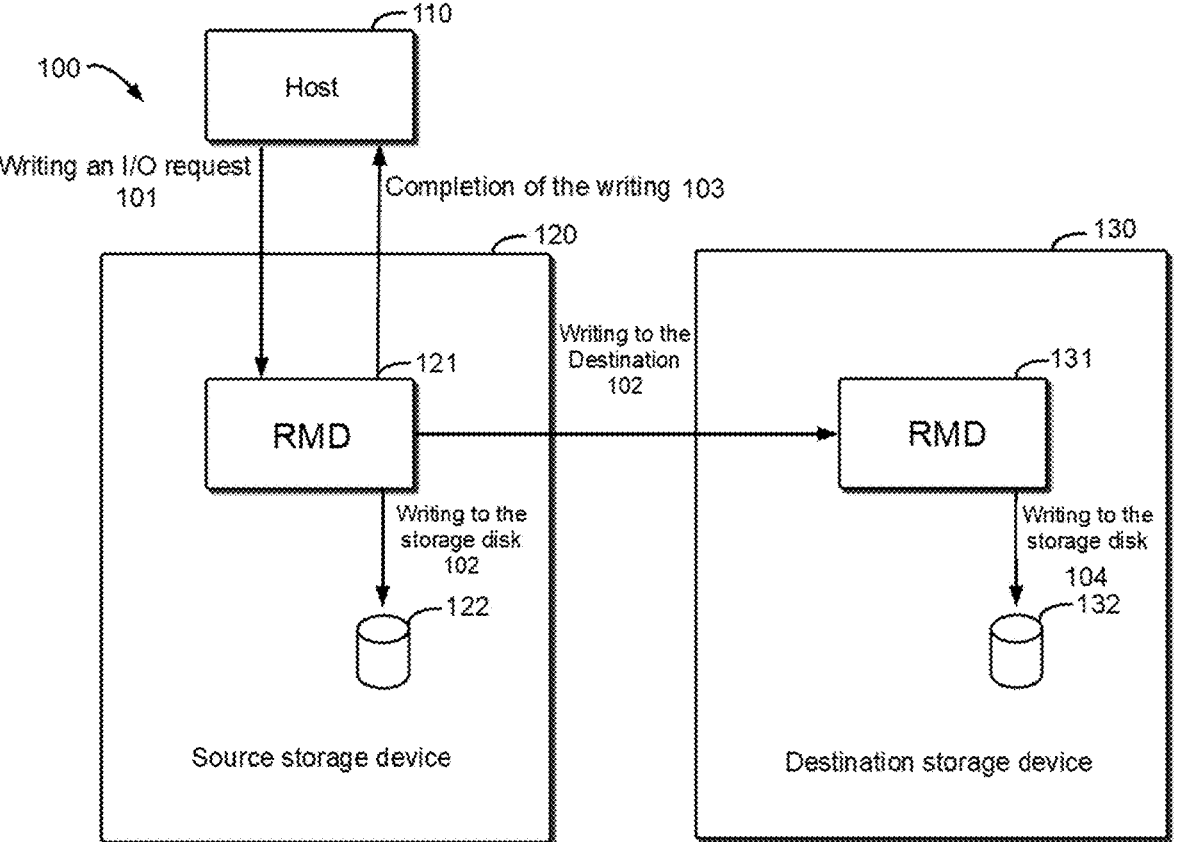
FIG. 1 illustrates a schematic diagram of an example environment in which a plurality of embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The embodiments of the present disclosure will be described below in further detail with reference to the accompanying drawings. Although the accompanying drawings show some embodiments of the present disclosure, it should be understood that the present disclosure may be implemented in various forms, and should not be explained as being limited to the embodiments stated herein. Rather, these embodiments are provided for understanding the present disclosure more thoroughly and completely. It should be understood that the accompanying drawings and embodiments of the present disclosure are for example purposes only, and are not intended to limit the scope of protection of the present disclosure.

In the description of the embodiments of the present disclosure, the term "include" and similar terms thereof should be understood as open-ended inclusion, that is, "including but not limited to." The term "based on" should be understood as "based at least in part on." The term "an embodiment" or "the embodiment" should be understood as "at least one embodiment." The terms "first," "second," and the like may refer to different or identical objects. Other explicit and implicit definitions may also be included below.

Hereinafter, an I/O request is used interchangeably with an I/O write request, a request, or data, a source storage device is used interchangeably with a main station, a main storage device, a local station, a local storage device, or a source, and a destination storage device is used interchangeably with a secondary station, a backup station, a remote storage device, a secondary storage device, or a destination. Hereinafter, an LBA is used to refer to the logical address of the data in the I/O request corresponding to that LBA, and thus an LBA is used interchangeably with an I/O request or data.

The data replication process involves transmitting I/O requests from a host (e.g., an application program) to a source storage device and transmitting the I/O requests from the source storage device to a destination storage device via a fiber channel. Due to the long distance between the source storage device and the destination storage devices and the limited fiber channel transmission rate, the replication of data from the source storage device to the destination storage device may take a long time, which degrades the user experience. Therefore, it is desired to reduce the time for data replication between the source storage device and the destination storage device.

On the other hand, almost all enterprise-level storage devices on the market are based on journal logs. Journal logging is a mechanism that provides local protection in a storage device. I/O requests received from a fiber channel or local hosts are committed to a journal log zone via the cache of a storage device and thus written to a journal log disk, instead of being directly written to a storage disk. Writing to the storage disk generally requires that the data be converted through mapping and written to the storage disk in the background, which process is called flush. This mechanism of journal logging provides local protection for the storage device, and if the storage device loses power, the data can be recovered by combining the journal logs and the data in the storage disk. If I/O requests are written to the journal log disk, these I/O requests can be immediately acknowledged to the write initiator while the data in these I/O requests can be flushed in the background. Here, flushing refers to writing data to the storage disk while clearing the data in the journal log disk as required by the program to recycle space on the journal log disk.

Generally, writing to the journal log disk is faster than writing to a particular position on the storage disk. Writing I/O requests to the journal log disk can reduce the disk seek time, especially if the journal log disk is an NVRAM device with a higher write speed. As a result, I/O requests do not need to wait to be flushed to the storage disk, which enables the bandwidth of such a journal log-based storage device to be much faster than a storage device that writes each I/O request directly to the storage disk. Nonetheless, writing I/O requests to the journal log disk and clearing I/O requests from the journal log disk is still time consuming, which in turn increases the time for data replication between the source storage device and the destination storage device.

For this reason, embodiments of the present disclosure propose a scheme for replicating data. In embodiments of the present disclosure, a destination storage device can receive a first set of input/output (I/O) requests from a source storage device, the first set of I/O requests having a first set of logical block addresses (LBAs); write data in the first set of I/O requests to a cache of the destination storage device; flush the data from the cache to a storage disk of the destination storage device; and record a particular LBA in the destination storage device, the particular LBA corresponding to the last LBA to which the destination storage device is flushed; and then send the particular LBA from the destination storage device to the source storage device to enable clearing of journals before the particular LBA in the source storage device.

In this way, in the destination storage device, the data in the I/O requests can be kept from being written to and cleared from the journal log disk, thereby making it possible to reduce the time spent on replicating data from the source storage device to the destination storage device to improve the user experience, and at the same time, making it possible to reduce the CPU and I/O consumption at the destination storage device, and also to reduce the wear and tear of the journal log disk in the destination storage device to prolong its service life.

FIG. 1 illustrates a schematic diagram of an example environment 100 in which a plurality of embodiments of the present disclosure can be implemented. Specifically, the environment 100 corresponds to sync replication. As shown in FIG. 1, the environment 100 includes a host 110, a source storage device 120, and a destination storage device 130. As shown in FIG. 1, the source storage device 120 includes a remote mirror driver (RMD) 121 and a storage disk 122. The destination storage device 130 includes an RMD 131 and a storage disk 132. It should be understood that the host 110 may be an application, for example, a NAS file system or a database. The host 110 and the source storage device 120 may be located at different geographic locations and transmit data via various remote protocols. The host 110 and the source storage device 120 may also be located at the same geographic location and transmit data through cables. The source storage device 120 and the destination storage device 130 may be located at different geographic locations, for example, tens of kilometers apart, and transmit data over a fiber channel.

As shown in FIG. 1, at 101, the source storage device 120 receives an I/O request from the host 110. Specifically, the source storage device 120 receives the I/O request from the host 110 via the RMD 121. At 102, the source storage device 120 writes the I/O request to the storage disk 122. Specifically, the source storage device 120 writes the I/O request to its own storage disk 122 via the RMD 121. At 103, after the source storage device 120 writes the I/O request into the storage disk 122, a reply acknowledge message (Ack) is sent from the source storage device 120 to the host 110 to notify completion of the writing of the I/O request.

At 102, the source storage device 120 also transmits the I/O request to the destination storage device 130. Specifically, the source storage device 120 writes the I/O request to the RMD 131 of the destination storage device 130 via the RMD 121. Moreover, at 104, the destination storage device 130 writes the I/O request to the storage disk 132. Specifically, the destination storage device 130 writes the I/O request to its own storage disk 132 via the RMD 131.

Sync replication corresponding to the environment 100 uses the RMD 121 to replicate data from the source storage device 120 to the destination storage device 130. The RMD is a hierarchical driver in a storage system that splits the I/O request on a storage resource participating in the sync replication as a source storage device, sends them separately to the local and remote storage devices, then waits for acknowledges from both storage devices, and finally returns them. Here, the local storage device refers to the source storage device 120, and the remote storage device refers to the destination storage device 130. The RMD will use a bitmap known as a fracture log (FL) to track any changes during mirroring of the fractured state, and then transfer the fracture log from the source storage device to the remote storage device upon resynchronization. Here, the fractured state is a state in which the destination storage device 130 loses power (e.g., an administrator manually pauses the replication session or an incident occurs at the storage device) or the transmission medium (e.g., a fiber channel) is disconnected, in which case the I/O requests transmitted from the host 110 to the source storage device 120 continue to accumulate in the source storage device 120, which is referred to as a fracture log. Resynchronization is a state in which the source storage device 120 and the destination storage device 130 resume data transmission for synchronization after the destination storage device 130 is powered up or a transmission cutoff (e.g., a fiber channel) is reconnected, as described specifically below.

Replication is typically performed by components on an upper deck of the entire storage device. How the RMD drives the I/O request to fall into the disk usually requires a call to a page data API provided by a lower deck component. Generally, the lower deck (such as journal logs, caches, RAID, and storage disks) is not directly exposed to the RMD, but is encapsulated into contiguous space to serve as a logical device (LBA, which is the logical address of the described data) and thus exposed to the RMD. At the destination storage device, the time consumed to receive and parse packet headers from the fiber channel at the RMD layer is almost negligible, while writing I/O requests through the lower deck API limits the system performance at the destination storage device. The process of writing an I/O request through the lower deck API will go through writing to the cache, writing to a journal log, page copying, constructing a scatter gather list (SGL), RAID addressing, and persisting into the disk (NVRAM, SSD, or HDD) via PCIe/HBA. All of these paths are necessary to achieve persistent storage.

The read rate of the source storage device 120 is not a bottleneck. In general, reading data is always faster than writing data. After increasing the depth of pumping I/O requests in the RMD, the probability of a read cache miss can be greatly reduced, and the RMD I/O requests on (for writing into) the destination storage device 130 can always be in queue saturation.

Figure 2:
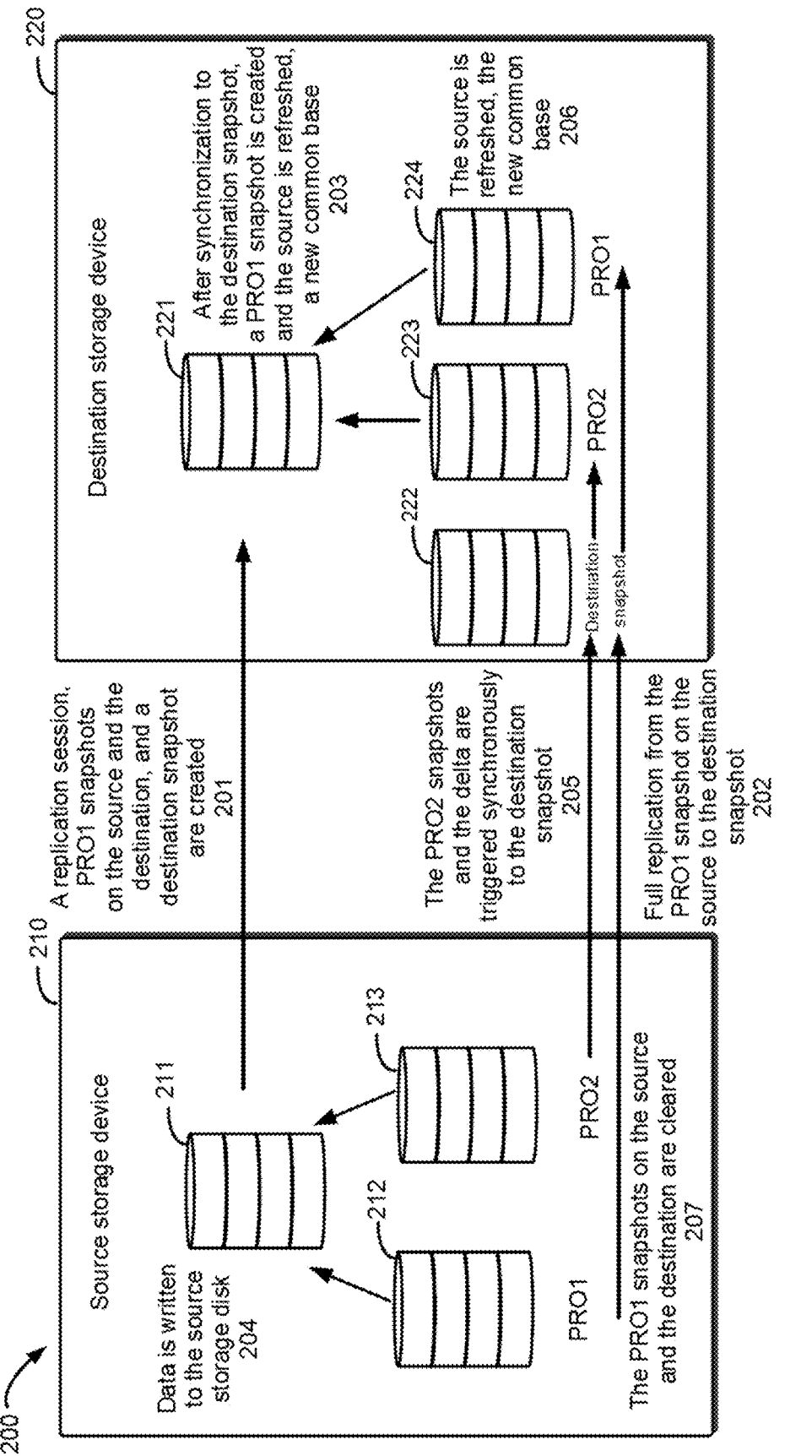
FIG. 2 illustrates a schematic diagram of another example environment in which a plurality of embodiments of the present disclosure can be implemented.

FIG. 2 illustrates a schematic diagram of another example environment 200 in which a plurality of embodiments of the present disclosure can be implemented. Specifically, the environment 200 corresponds to async replication. As shown in FIG. 2, the environment 200 includes a source storage device 210 and a destination storage device 220, with the host omitted in FIG. 2. Snapshot-based async replication utilizes space-valid snapshots to replicate point-in-time consistent copies of a plurality of disk partitions (also known as volumes). Instead of requiring the destination storage device 220 to be a mirror of the source storage device 210 at the same time on each I/O request, async replication only needs the destination storage device 220 to periodically synchronize with the source storage device 210 on recovery point objectives (RPOs). When the async replication changes to an IN_SYNC state, the source and destination storage devices 210 and 220 have a common base snapshot pair. When an RPO comes, the source storage device 210 acquires the snapshot at that point and transfers a delta between the common bases. The destination storage device 220 receives the I/O request from the source storage device 210 using the destination snapshot and refreshes the common base when the transmission is completed.

As shown in FIG. 2, the source storage device 210 includes a storage disk 211, a PRO1 212, and a PRO2 213. The destination storage device 220 includes a storage disk 221, a destination snapshot 222, a PRO2 223, and a PRO1 224. At 201, a replication session, PRO1 snapshots on the source storage device 210 and the destination storage device 220, and a destination snapshot on the destination storage device 220 are created. At 202, the PRO1 snapshot on the source storage device 210 is copied to the destination snapshot on the destination storage device 220. At 203, after synchronization to the destination snapshot, a PRO1 snapshot is created in the destination storage device 220, and the source storage device 210 is refreshed while a new common base is created. At 204, data is written to the storage disk in the source storage device 210. At 205, the next replication cycle triggers replication of the PRO2 snapshot and the delta to the destination snapshot. At 206, the source storage device 210 is refreshed, which is a new common base at this point. At 207, the PRO1 snapshots on the source storage device 210 and the destination storage device 220 are cleared (or deleted).

In some embodiments, async replication accomplishes the replication task using a module known as a replication engine. Similar to the sync replication, the lower deck components provide a page data API for the replication engine to call the page data API. The replication engine is typically separate from caching, journal log, and other modules.

As mentioned above, writing I/O requests to a journal log disk is a technical bottleneck in journal log-based storage devices. Regarding this problem, the present inventors envisioned a journal log shortcut scheme and found that in this scheme, the throughput of the entire system can be greatly improved. The journal log shortcut scheme envisioned by the inventors and its technical effects will be described below. In the journal log shortcut scheme, the journal log disk can be shortcut without the need for local protection (no reboot, no power loss, no failover). Shortcutting the journal log disk here means skipping the journal log disk, in other words, without storing the I/O requests to the journal log disk.

As an example, the storage device MLK EX4 uses up to 38 out of 56 CPU cores for flushing on each node. When an I/O request arrives, the I/O request is logged to the journal log, the data page will be accumulated in the cache, and a flusher will adjust the use of the CPU-cores to release the cache for writing to the storage disk. At an extreme I/O request rate, transactional journal logs (TxLog) accumulate to the point where the storage space is almost exhausted and the flushing cores still has capacity (the CPU utilization of the flushing cores in the inventor's experiments is about 30%). If the journal log disk is shortcut, the utilization of the flushing cores grows to 80% to 90% and the highest performance can be achieved, and the cause for traffic limitation of I/O requests will shift from journal logging to cache fullness. In this way, the journal log disk will no longer be a technical bottleneck.

Skipping the entire journal log disk is not easy because the cache and journal log disk implementations may well be tightly coupled to existing storage devices. However, skipping the persisting of journal logs into a journal log disk (e.g., NVRAM) and keeping the journal logs in a dynamic memory (RAM) is an economic balance that can be simply achieved.

As an example, a storage device may persist journal logs on an NVRAM on hardware, which means that local write journals are only written to dynamic memory (RAM) and do not fall into the journal log disk. The inventors have developed a journal log shortcut tool for pre-populating data at a storage device. This journal log shortcut tool skips persisting of journal logs on NVRAM and saves the journal logs in a dynamic memory (RAM). Table 1 illustrates the performance changes caused by the journal log shortcut tool on different types of storage devices:

TABLE 1

| System type | Baseline IOPS (bs = 256K)/Bandwidth | Shortcut IOPS (bs = 256K)/Bandwidth | Percentage increase |
|---|---|---|---|
| Hardware 1 | 10158 (2540 MB/s) | 18495 (4623 MB/s) | 82.1% |
| Hardware 2 | 11056 (2764 MB/s) | 29351 (7338 MB/s) | 165.4% |
| Hardware 3 | 22958 (5740 MB/s) | 36368 (9092 MB/s) | 58.4% |
| Hardware 4 | 21707 (5427 MB/s) | 37203 (9301 MB/s) | 71.4% |

This example demonstrates that skipping the persisting of journal logs on NVRAM can dramatically increase the data replication rate. Since this technique skips the persisting of journal logs (i.e., no write to the disk), there will be data loss if the storage device suddenly loses power. Local protection will be regained after all the dirty data has been flushed to the storage disk and the marker in the journal log has been updated, the marker indicating that space for the previous journal data can be reused for the newly arriving I/O request. Thus, the period of potential data loss is only a short time period, e.g., a few seconds to a few minutes. As can be seen, this scheme sacrifices local protection of data integrity for a short period of time, yet considerable efficiency gains can be obtained.

The inventors have found that the journal log shortcut approach is applicable to at least four replication scenarios, including, for example, an initial replication phase of sync replication/data migration (hereinafter referred to as the first scenario), a resynchronization phase of sync replication/data migration (hereinafter referred to as the second scenario), an initial replication phase of snapshot-based async replication (hereinafter referred to as the third scenario), and a delta replication phase of snapshot-based async replication (hereinafter referred to as the fourth scenario).

For the first and third scenarios, if the initial copy is in progress, the destination storage device cannot provide data, regardless of whether local protection is lost. If the destination storage device suddenly loses power, the source storage device will perform retransmission from the start point or save point.

For the second scenario, the resynchronization phase of the sync replication is similar to the initial replication phase. After the initial copy, the replication session is fully established and is changed to the IN_SYNC state. In this state, I/O requests from the host are separated to the source and destination storage devices simultaneously, and the I/O requests are completed after write acknowledges are received from both the storage devices.

If the fiber channel is broken or the administrator manually suspends the replication session, the IN_SYNC state changes to a consistent state (IN_CONSISTENT state), also known as a fractured state, and an I/O request from the host will be written only to the source storage device and its fracture log will be accumulated. When the fiber channel is restored or the replication session is manually resumed, resynchronization begins, allowing the source storage device to begin transferring data from the breakpoint. During the resynchronization phase, the source storage device is responsible for maintaining the data, while the destination storage device cannot guarantee the integrity of the data. Since the destination storage device is not failoverable, the resynchronized data that recently arrived at the destination storage device does not need to be locally protected during this phase either. After the resynchronization, the replication session enters the IN_SYNC state, the host writes the I/O request to both the storage devices at the same time, and local journal log protection needs to be re-enabled for the destination storage device.

For the fourth scenario, if snapshot-based async replication has been established, the storage system already has a common base. Then, during an RPO or manual synchronization, the source storage system typically obtains a new snapshot, parses the difference (i.e., the delta) between the common base snapshot and the latest snapshot, and then transfers the delta to the destination storage device. The destination storage device writes the delta to the snapshot. During delta replication, the latest delta data on the destination storage device is not available. If the destination storage device loses power, the source storage device will be responsible for retransmitting the delta from the start point or save point. The destination memory only guarantees the data integrity of the previous snapshot during this phase.

In some embodiments, the technical solution of the present disclosure may be particularly useful for the first scenario and the third scenario.

Figure 3:
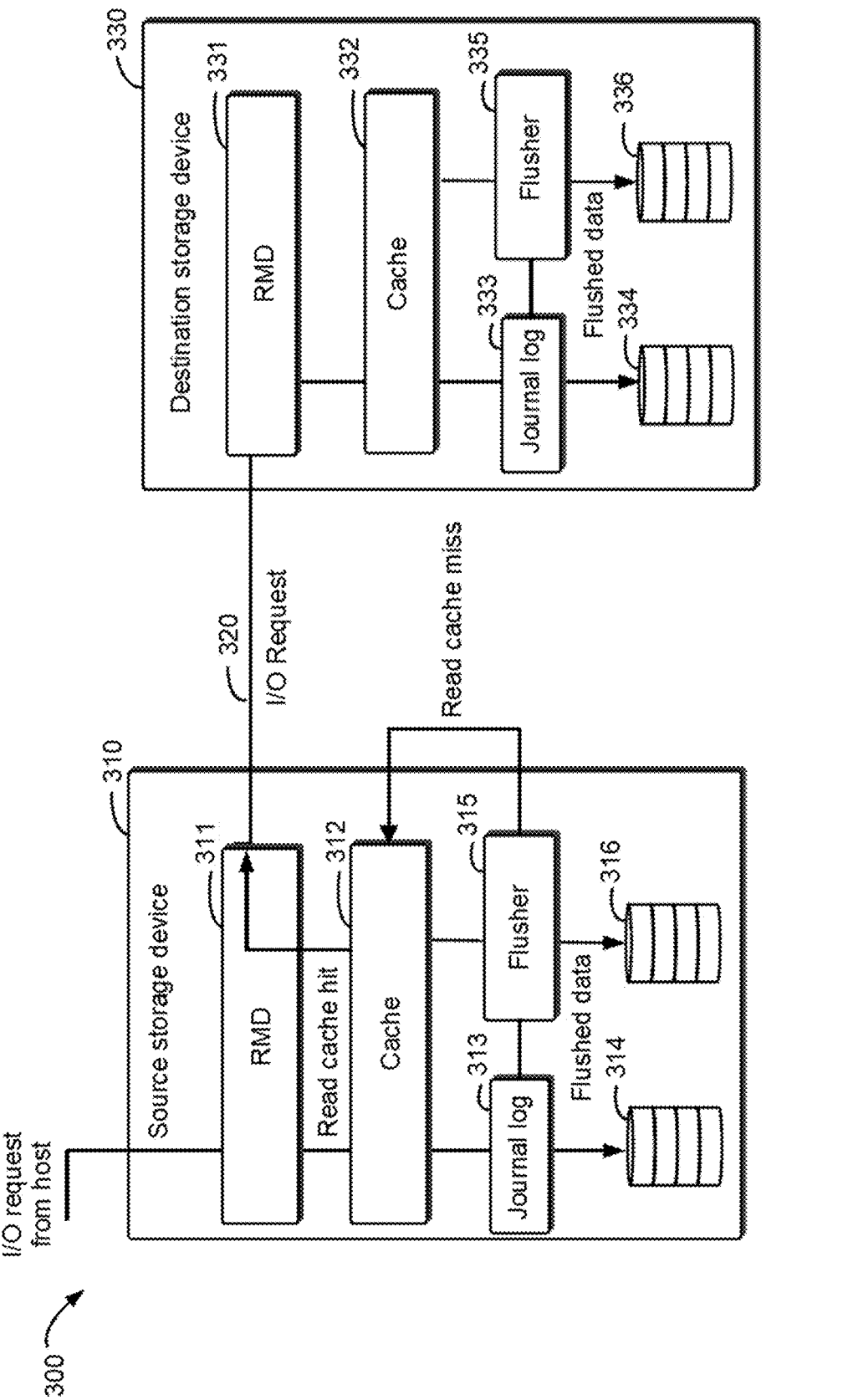
FIG. 3 illustrates a schematic diagram of a conventional storage device architecture.

FIG. 3 illustrates a schematic diagram of a conventional storage device architecture 300. The storage device architecture 300 is a storage device architecture for sync replication and may correspond to the first scenario and the second scenario described above. As shown in FIG. 3, the storage device architecture 300 includes a source storage device 310 and a destination storage device 330 that performs data transmission with the source storage device 310 via a fiber channel 320. The source storage device 310 includes an RMD 211, a cache 312, a journal log 313, a journal log disk 314, a flusher 315, and a storage disk 316.

The destination storage device 330 includes an RMD 331, a cache 332, a journal log 333, a journal log disk 334, a flusher 335, and a storage disk 336.

The source storage device 310 receives an I/O request from the host. In the source storage device 310, this I/O request is written to the journal log disk 314 via the RMD 311, the cache 312, and the journal log 313. At the same time, the I/O request from the journal log 313 and the cache 312 may be combined in the flusher and written to the storage disk 316 by the flusher 315. In the case where the flusher 315 has written (or flushed) the I/O request into the storage disk 316, the I/O request in the journal log disk 314 is cleared. Alternatively, the I/O request in the cache 312 may be read by the RMD 311 and transmitted to the destination storage device 330 via the fiber channel 320. In the destination storage device 330, the I/O request goes through the same write path as in the source storage device 310.

During the initial synchronization and resynchronization phases, in the destination storage device 330, the I/O request comes from reading the cache 310/storage disk 316 of the source storage device rather than directly from the host. Unlike the IN_SYNC state, the I/O request from the host and the I/O request to the destination storage device 330 take two independent paths. Generally, the I/O request is transferred from small LBAs to large LBAs in a sequential manner. Note that, during the initial replication or the resynchronization, if the LBA is greater than the pump LBA, the newly arriving host I/O request will be accumulated, and if the LBA is less than the pump LBA, the I/O request is separated into two paths, as in the IN_SYNC state.

Figure 4:
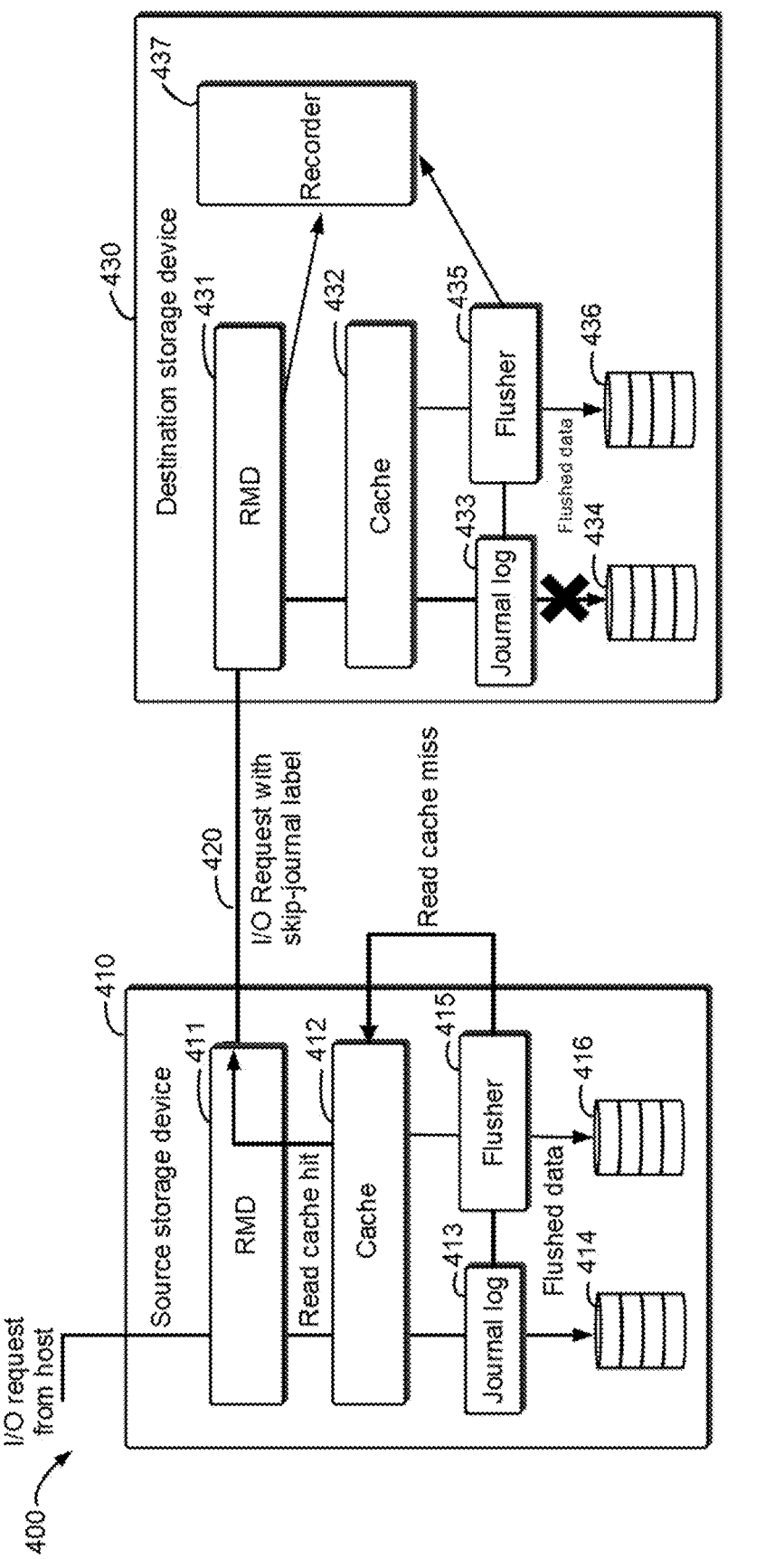
FIG. 4 illustrates a schematic diagram of a storage device architecture of a plurality of embodiments of the present disclosure.

FIG. 4 illustrates a schematic diagram of a storage device architecture 400 of a plurality of embodiments of the present disclosure. The storage device architecture 400 uses a journal log shortcut scheme. The storage device architecture 400 includes similar components to the storage device architecture 300, where the similar components are indicated by similar reference numerals and will not be further described. The difference is that the destination storage device 430 of the storage device architecture 400 further includes a recorder 437, and the recorder 437 is used to record the LBA of the I/O request last flushed by the flusher 435, i.e., the last LBA to which the destination storage device 430 is flushed. Hereinafter, the last LBA to which the destination storage device 430 is flushed is also referred to as a particular LBA. In the destination storage device 430, the persisting of the journal log 433 to the journal log disk 434 may be skipped. In addition, each of the I/O requests pumped from the source storage device 410 to the destination storage device 430 is tagged with a "skip-journal" label. When this label is detected, the destination storage device skips the persisting into the journal log disk 434. Methods 500-700 for replicating data that may be performed in the storage device architecture 400 will be described below with reference to FIGS. 5-7.

FIG. 5 illustrates a flow chart of a method 500 for replicating data of a plurality of embodiments of the present disclosure. The method 500 includes: at block 502, receiving, by a destination storage device, a first set of input/output (I/O) requests from a source storage device, the first set of I/O requests having a first set of logical block addresses (LBAs); at block 504, writing data in the first set of I/O requests to a cache of the destination storage device; at block 504, flushing the data from the cache to a storage disk of the destination storage device; at block 506, recording a particular LBA in the destination storage device, the particular LBA corresponding to the last LBA to which the destination storage device is flushed; and at block 508, sending the particular LBA from the destination storage device to the source storage device to enable clearing of journals before the particular LBA in the source storage device.

With this method 500, in the destination storage device, the data in the I/O requests can be kept from being written to and cleared from the journal log disk, thereby making it possible to reduce the time spent on replicating data from the source storage device to the destination storage device to improve the user experience, and at the same time, making it possible to reduce the CPU and I/O consumption at the destination storage device, and also to reduce the wear and tear of the journal log disk in the destination storage device to prolong its service life.

In some embodiments, the particular LBA may be sent from the destination storage device to the source storage device by including the particular LBA in the header of an acknowledge reply message sent from the destination storage device to the source storage device. In another embodiment, the particular LBA may be sent from the destination storage device to the source storage device by sending a notification message indicating the particular LBA.

In some embodiments, clearing of journals before the particular LBA in the source storage device includes: for sync replication, clearing fracture logs before the particular LBA in the source storage device. In another embodiment, clearing of journals before the particular LBA in the source storage device includes: for async replication, updating a save point to the particular LBA in the source storage device.

FIG. 6 illustrates a flow chart of another method 600 for replicating data of a plurality of embodiments of the present disclosure. The method 600 includes blocks 604-612 that are identical to the blocks 502-510 in the method 500, with the difference that the method 600 further includes: at block 602, enabling a skip mode in the destination storage device before receiving the first set of I/O requests from the source storage device; and at block 616, exiting the skip mode in the destination storage device in response to all journals in the source storage device being cleared. In some embodiments, the skip mode may be set for a particular disk partition, and in the skip mode, all I/O requests under that partition are skipped. In another embodiment, the skip mode may be set for particular I/O requests, and in the skip mode, part of the I/O requests in the same disk partition are skipped and the other I/O requests are not skipped. In some embodiments, in the skip mode, the first set of I/O requests are not written to the journal log disk of the destination storage device.

As shown in FIG. 6, exiting the skip mode in the destination storage device at block 616 may include: at block 6160, the particular LBA recorded in the destination storage device is cleared; and at block 6162, the source storage device is set to be in synchronization with the destination storage device.

In some embodiments, a timer is set in the source storage device, wherein the timer is used to query in the destination storage device whether an LBA of a last I/O request from the source storage device is equal to the particular LBA. For example, all journals in the source storage device are allowed to be cleared in the case where the LBA of the last I/O request is found to be equal to the particular LBA.

In some embodiments, setting the source storage device to be in synchronization with the destination storage device includes: for sync replication, changing a session state to an IN_SYNC state; or for async replication, establishing or refreshing a common base.

In some embodiments, wherein enabling a skip mode in the destination storage device includes enabling the skip mode independently for different disk partitions in the destination storage device.

In some embodiments, a modern storage device has a plurality of volumes (i.e., disk partitions), and each disk partition should be independent of the other disk partitions. For example, the storage device maps each disk partition space (e.g., the LBA may be 0 B-256 TB) to the global mapper space (e.g., the LBA may be 0 B-8 EB), and each disk partition has its own range numerically isolated from other disk partitions in the mapper space, for example, disk partition 1 may be mapped to 256 TB-512 PB, and disk partition 2 may be mapped to 512 TB-768 TB. The flusher and the TxLog are in the view of the mapper space, but not each disk partition space. In some embodiments, during the initial replication, if it is completed for some disk partitions and still in progress for some disk partitions, among the journal log entries on the disk, there will be some entries unskipped and some entries skipped. This requires that the journal log entries have disk partition IDs that can distinguish between replication sessions, and requires a version field to control which entries in the journal log disk are pseudo-entries (the journal log zone is usually organized in a ring structure that forms a cyclic space, and those that are located outside of the cyclic space must be excluded during journal recovery). Recovery of journal log entries must exclude pseudo-entries.

In another embodiment, the flusher records the last flushed LBA for each disk partition. This is feasible under the smooth flush architecture of the storage system because the smooth flush technique has an "I/O request ingestion page container tree" for each disk zone (where each disk zone represents each disk partition) to be flushed in the dynamic memory, and it is easy to acquire the last LBA from the page container tree and record the flushed LBA for each disk partition by computing the reverse mapping. It should be understood that it is also feasible to record the last flushed LBA for each volume in other flush techniques.

FIG. 7 illustrates a flow chart of yet another method 700 for replicating data of a plurality of embodiments of the present disclosure. The method 700 includes blocks 702-710 that are identical to the blocks 502-510 in the method 500, with the difference that the method 700 may iteratively perform the processing of the blocks 702-710 for different sets of I/O requests. For example, the method 700 further includes: at block 712, receiving, by the destination storage device, a second set of I/O requests from the source storage device, the second set of I/O requests having a second set of LBAs; at block 714, writing data in the second set of I/O requests to the cache of the destination storage device; at block 716, flushing the data in the second set of I/O requests from the cache to the storage disk of the destination storage device; at block 718, updating a recorded second particular LBA in the destination storage device according to the second set of LBAs; and at block 720, sending the updated second particular LBA from the destination storage device to the source storage device to enable clearing of journals before the updated particular LBA in the source storage device.

It should be understood that the first set of LBAs and the second set of LBAs may be of the same length or of different lengths, which means that the number of the first set of I/O requests may be the same as or different from that of the second set of I/O requests, which is not limited here. It should be understood that the method 700 may iterate for I/O requests until the last I/O request, and when the LBA of the last I/O request is equal to the particular LBA, it may be determined that all journals in the source storage device are cleared. Next, in the destination storage device, the recorded particular LBA is cleared, and the source storage device is notified to enable the source storage device to be in synchronization with the destination storage device.

In some embodiments, the method 700 may further include a block 722 between the blocks 710 and 712: at block 722, receiving a third set of I/O requests, the third set of I/O requests having a third set of LBAs, wherein the third set of LBAs is between the first set of LBAs and the second set of LBAs.

In some embodiments, the process of reading the LBAs (or the data in the I/O requests) from the buffer in the source storage device and the process of flushing the LBAs (or the data in the I/O requests) in the destination storage device are two processes independent from each other. Therefore, the LBA received in the source storage device is not necessarily equal to the LBA flushed in the destination storage device. Further, the particular LBA or the updated particular LBA is not necessarily related to a set of LBAs of a set of I/O requests that are simultaneously read in the source storage device. Specifically, the particular LBA may be the largest LBA in the set of LBAs, or may not be the largest LBA in the set of LBAs, or may not be any LBA in the set of LBAs.

Figure 8:
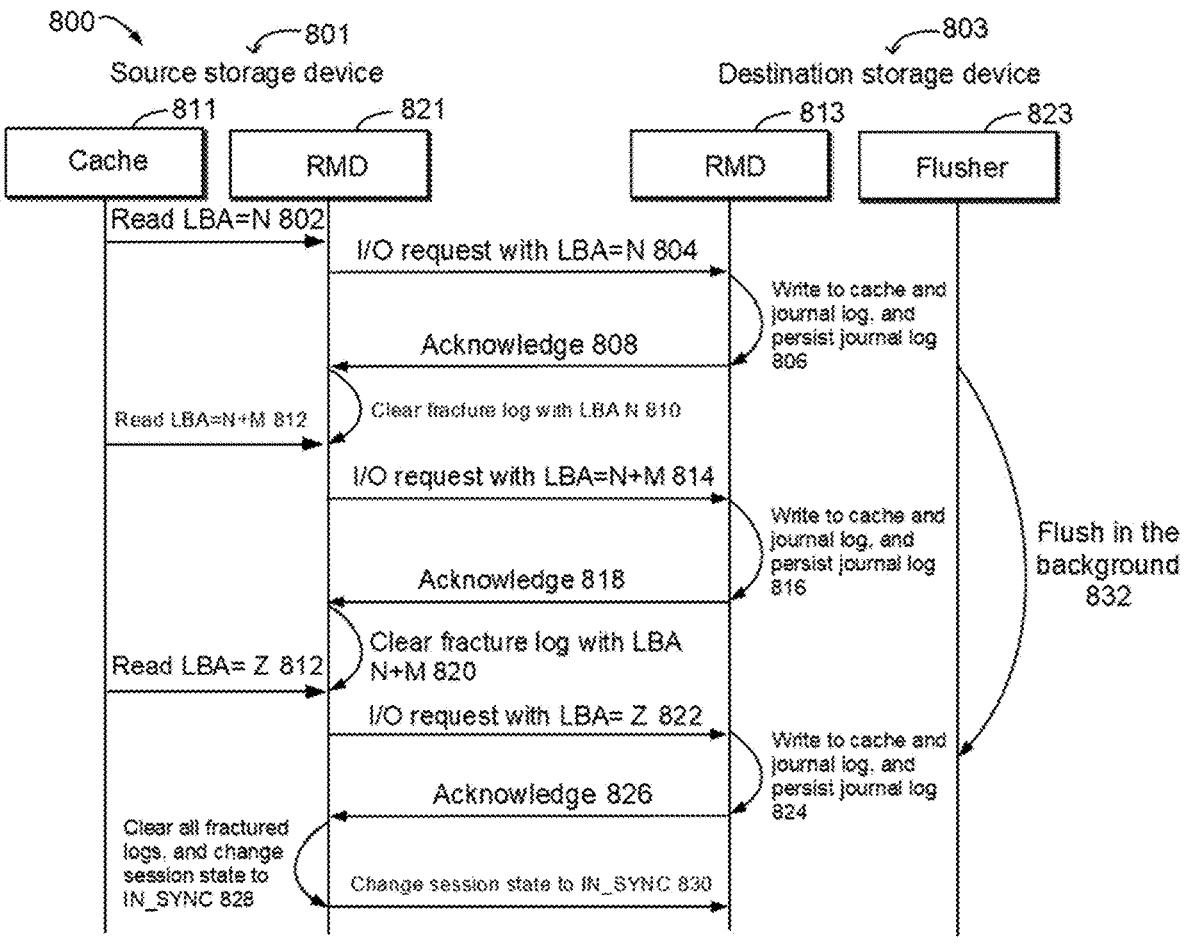
FIG. 8 illustrates a schematic diagram of a data replication process in conventional sync replication.
Figure 9:
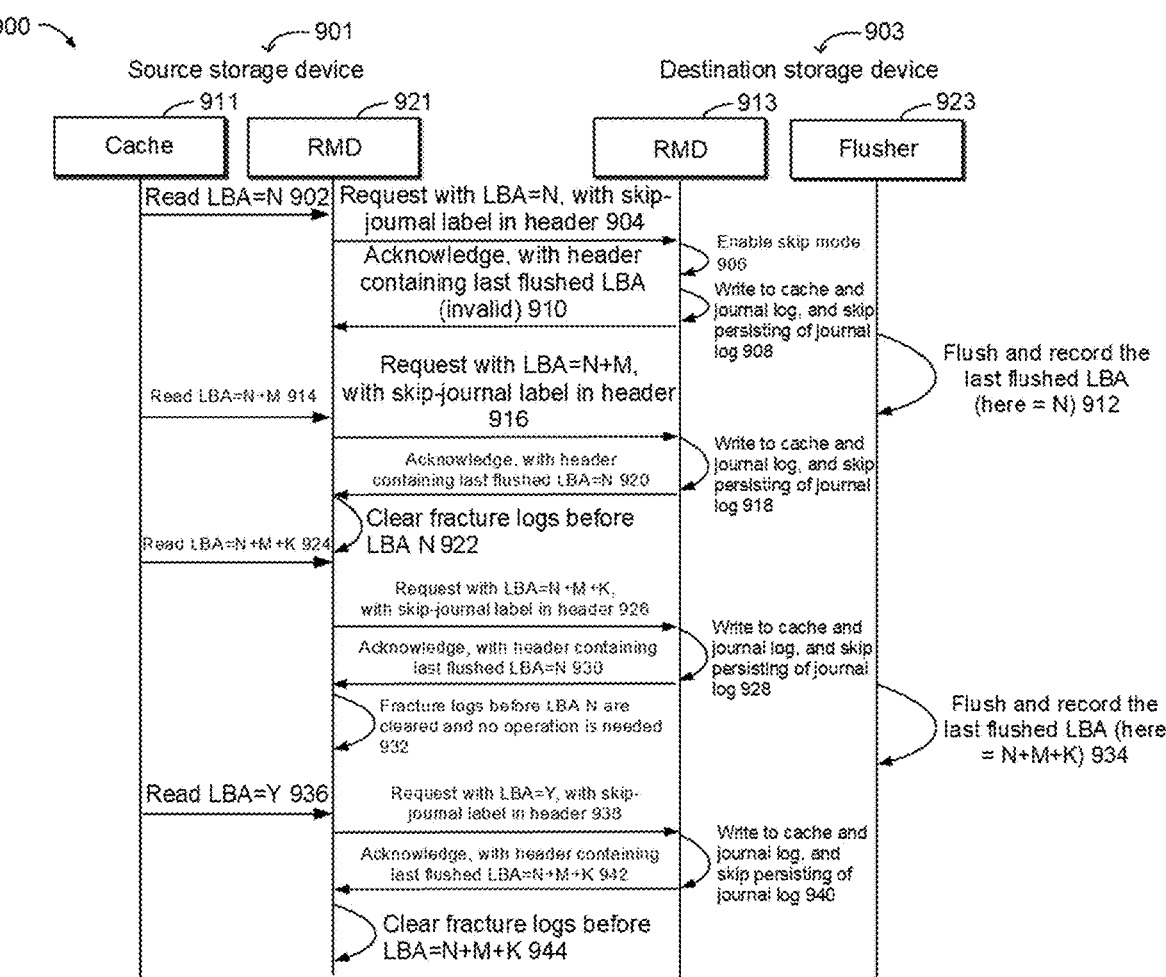
FIG. 9 illustrates a schematic diagram of a data replication process in sync replication of a plurality of embodiments of the present disclosure.
Figure 10:
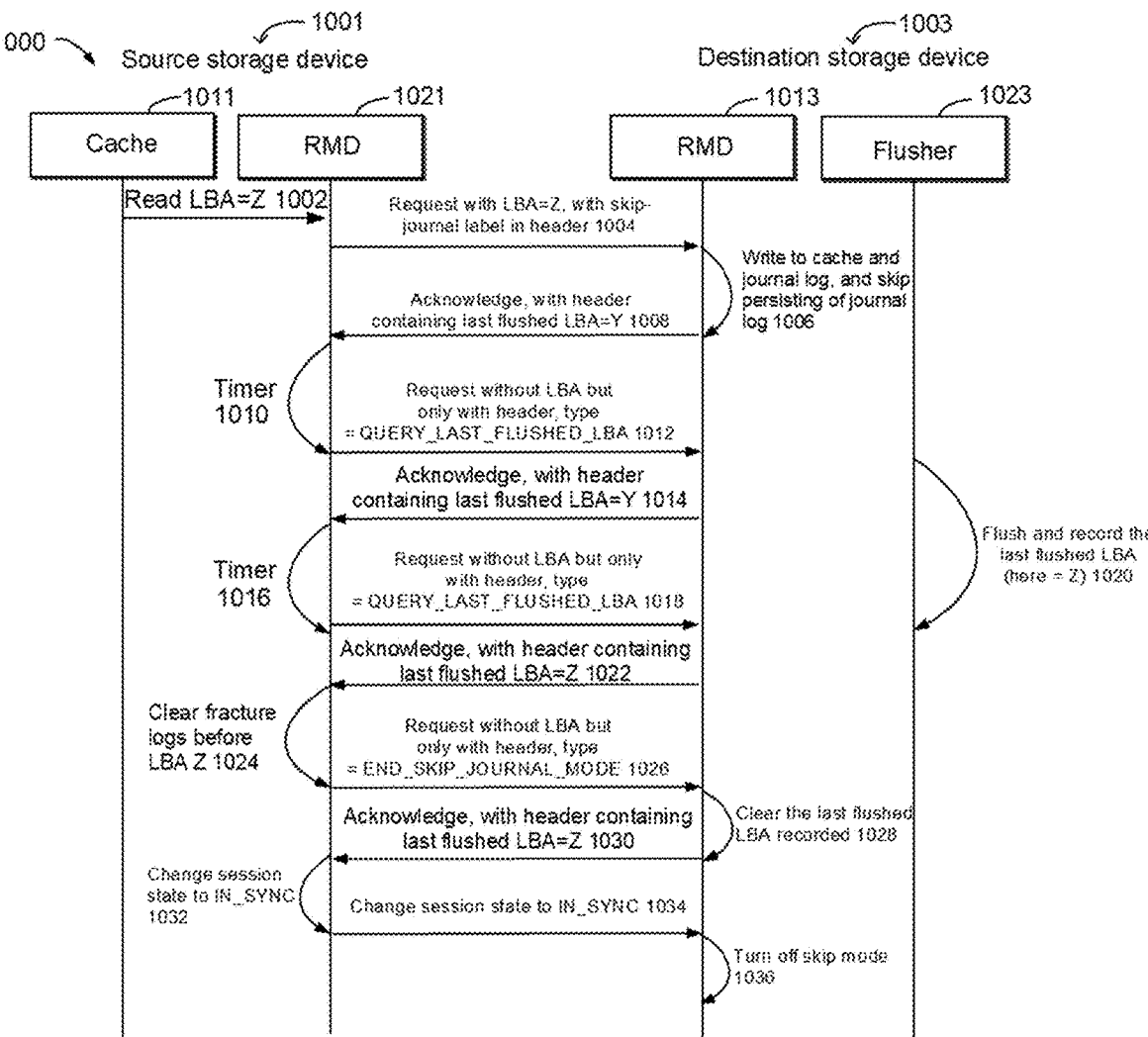
FIG. 10 illustrates a schematic diagram of an end phase of a data replication process in sync replication of a plurality of embodiments of the present disclosure.

Hereinafter, with reference to FIGS. 8-10, the data replication process in the conventional sync replication is compared with the data replication process in the sync replication according to a plurality of embodiments of the present disclosure. The data replication processes in FIGS. 8-10 are applicable to sync replication of the first scenario and the second scenario. For case of illustration, only the cache and the RMD in the source storage device and the RMD and the flusher in the destination storage device are shown in the following accompanying drawings.

FIG. 8 illustrates a schematic diagram of a data replication process 800 in conventional sync replication. In the replication process 800, at 802, in the source storage device 801, the RMD 821 reads LBA=N from the cache 811; at 804, an I/O request with LBA=N is transmitted from the RMD 821 of the source storage device 801 to an RMD 813 of a destination storage device 803; at 806, in the destination storage device 803, the I/O request with LBA=N is written to the cache and the journal log, and the journal log is persisted into the journal log disk; at 808, an acknowledge message is sent from the destination storage device 803 to the source storage device 801, which is used to acknowledge that the data has been stored to the journal log disk of the destination storage device 803; and at 810, in the source storage device 801, the fracture log of the LBA N is cleared. At 812-818, the processes 802-810 continue to be iterated for larger LBA=N+M until the last LBA=Z is read at 812. Meanwhile, at 832, the data is continuously flushed in the background in the flusher 823 of the destination storage device 803. With respect to the last LBA=Z, at 826, it is acknowledged that the data in the last I/O request has been persisted into the journal log disk of the destination storage device 803, then at 828, in the source storage device 801, the fracture logs are all cleared and the session state is changed to the IN_SYNC state, and at 830, the destination storage device 803 is notified of the change in the session state to the IN_SYNC state.

If the destination storage device 803 loses power during the initial replication or resynchronization phase, a reboot cannot recover data after the last flushed LBA. Thus, at the end of each flush, the last flushed LBA should be acknowledged by the destination storage device 820 to the source storage device (or periodically queried by the source storage device), and the source storage device 801 may clear the fracture logs before that LBA. Data located before this LBA can be considered to be IN_SYNC, and newly arriving I/O requests before this breakpoint can be separated into two pathways (to the source storage device and the destination storage device, respectively). If the source storage device obtains an acknowledge for each I/O request from the source storage device to the destination storage device, the source storage device clears the fracture logs.

FIG. 9 illustrates a schematic diagram of a data replication process 900 in sync replication according to a plurality of embodiments of the present disclosure. Specifically, FIG. 9 illustrates the data replication process until the penultimate I/O request is transmitted. In the replication process 900, at 902, in the source storage device 901, the RMD 921 reads LBA=N from the cache 911; at 904, an I/O request with LBA=N is transmitted from the RMD 921 of the source storage device 901 to an RMD 913 of a destination storage device 903, which has a "skip-journal" label in the header thereof; at 906, in the destination storage device 903, a skip mode is enabled for a particular disk partition (if the skip mode is disabled); at 908, in the destination storage device 903, the I/O request with LBA=N is written to the cache and the journal log, and the persisting of the journal log into the journal log disk is skipped; at 910, an acknowledge message is sent from the destination storage device 903 to the source storage device 901, wherein the header of the acknowledge message contains the last flushed LBA, this LBA being an invalid number since the destination storage device 903 has not been flushed at this time; at 912, for the particular disk partition, the flusher 923 flushes data in the background and records the last flushed LBA (i.e., the particular LBA), where for that disk partition, the last flushed LBA=N; meanwhile, at 914-918, in the source storage device 901, similar to LBA=N, a next set of I/O requests continues to be received, i.e., the next set of LBA=N+M is read and transmitted to the destination storage device 903 and written to the cache and journal logs in the destination storage device 903, and the persisting of the journal logs to the journal log disk is skipped; then at 920, an acknowledge message is sent from the destination storage device 903 to the source storage device 901, wherein the header of the acknowledge message contains the last flushed LBA=N (i.e., the particular LBA); at 922, the source storage device 901 clears fracture logs before LBA=N; at 924-930, the previous operations continue to be iterated for LBA=N+M+K; at 932, in the source storage device 901, fracture logs before LBA N are cleared and no operation is needed; after 930, at 934, the flusher 923 flushes and records the last flushed LBA=N+M+K (the updated particular LBA); at 936-940, the previous operations continue to be iterated for LBA=Y (which may correspond to the penultimate I/O request, for example); and at 942, an acknowledge message is sent from the destination storage device 903 to the source storage device 901, wherein the header of the acknowledge message contains the last flushed LBA=N+M+K (i.e., the updated particular LBA); and at 944, the source storage device 901 clears fracture logs before LBA=N+M+K.

In some embodiments, the source storage device is used to save the fracture log entries until an update of the flushed LBA is received. The flushed LBA may be transmitted in the header of the acknowledge message I/O_ack or via a notification message.

After the flushing, the last flushed tail marker needs to be recorded. The tail marker in the journal log is used to indicate which parts of the journal log (in order) were flushed and which parts were not flushed. The recovery should rebuild the cache from the tail marker. In the case where there is no tail marker, the recovery will redo the entire journal log from the first skip of persisting of the previous last tail marker, and will rebuild the cache of the flushed blocks by adding back-end data pages and dirty bytes to the journal log layer. Since the source storage device has already cleared the fracture logs before that tail marker and will not resynchronize the block again, there is a risk that the block will be corrupted by old data. The present disclosure can avoid the potential risks of different journal logging architectures and guarantee that the source storage device is the only source of uncommitted data (i.e., data not written to the journal log disk) during recovery and that the destination storage device does not touch any part of the journal log for the committed data (i.e., data written to the journal log disk) (which is not protected by the source fracture logs).

FIG. 10 illustrates a schematic diagram of an end phase 1000 of a data replication process in sync replication according to a plurality of embodiments of the present disclosure. Specifically, the end phase 1000 includes the process from transmitting the last I/O request to causing the session state to change to IN_SYNC. In the end phase 1000, LBA Y has been flushed and is recorded as the last flushed LBA. In the end phase 1000, at 1002, in a source storage device 1001, an RMD 1021 reads the last LBA=Z (which may correspond to the last I/O request, for example) from a cache 1011; at 1004, an I/O request with LBA=Z is transmitted from the RMD 1021 of the source storage device 1001 to the RMD 1013 of the destination storage device 1003, wherein the header thereof has a "skip-journal" label; at 1006, in the destination storage device 1003, the I/O request with LBA=N is written to the cache and the journal log, and the persisting of the journal log into the journal log disk is skipped; at 1008, an acknowledge message is sent from the destination storage device 1003 to the source storage device 1001, wherein the header of the acknowledge message contains the last flushed LBA=Y; at 1010, a timer is experienced in the source storage device 1001, wherein the timer is used to query in the destination storage device 1003 whether the LBA=Z of a last I/O request from the source storage device 1001 was flushed at the flusher 1023; at 1012, another type of request QUERY_LAST_FLUSHED_LBA is sent from the source storage device 1001 to the destination storage device 1003, which is used to query whether the LBA=Z of the last I/O request was flushed at the flusher 1023; at 1014, an acknowledge message is sent from the destination storage device 1003 to the source storage device 1001, wherein the header of the acknowledge message contains the last flushed LBA=Y, at which point the last LBA=Z has not been flushed; at 1016, the timer is experienced again in the source storage device 1001; at 1018, another type of request QUERY_LAST_FLUSHED_LBA is sent again by the source storage device 1001 to the destination storage device 1003, which is used to query whether the LBA=Z of the last I/O request was flushed at the flusher 1023; at 1020, the flusher 1023 flushes and records the last flushed LBA=Z, which means that the data in the last I/O request has been flushed; at 1022, an acknowledge message is sent from the destination storage device 1003 to the source storage device 1001, wherein the header of the acknowledge message contains the last flushed LBA=Z, which means that the last LBA=Z has been flushed; at 1024, in the source storage device 1001, the fracture logs before LBA Z are cleared; at 1026, another type of request END-_SKIP_JOURNAL_MODE is sent from the source storage device 1001 to the destination storage device 1003, which is used to cause the destination storage device 1003 to exit the skip mode; at 1028, the last flushed LBA recorded is cleared in the destination storage device 1003, which means that all particular LBAs are cleared; at 1030, an acknowledge message is sent from the destination storage device 1003 to the source storage device 1001, wherein the header of the acknowledge message contains the last flushed LBA=Z; at 1032, in the source storage device 1001, the session state is changed to the IN_SYNC state; at 1034, the source storage device 1001 notifies the destination storage device 1003 to change the session state to the IN_SYNC state; and at 1036, in the destination storage device 1003, the skip mode is turned off.

In some embodiments, in order to save the processing overheads for parsing each I/O request and clearing the submitted data from the fracture logs, it is possible to periodically query via another I/O request type (named here as QUERY_LAST_FLUSHED_LBA to differentiate it from an ordinary I/O request with data blocks) whether the last LBA is flushed at the destination storage device 1023.

In some embodiments, one or more timers can be set in the source storage device 1001, wherein the timers are used to query in the destination storage device 1003 whether an LBA of a last I/O request from the source storage device 1001 is equal to the particular LBA, and all journals are cleared in the source storage device 1001 in the case where the LBA of the last I/O request is found to be equal to the particular LBA. In some embodiments, one or more timers may be experienced in the source storage device 1001 until the LBA of the last I/O request is flushed at the flusher 1023, in other words, the particular LBA or the last flushed LBA in the destination storage device 1003 is equal to the last LBA. In some embodiments, the one or more timers may have the same or different time intervals.

In some embodiments, at the end of the initial replication or resynchronization phase, the last I/O request usually cannot get the flush completion indication. Therefore, the source storage device 1001 needs to perform some additional interactions with the destination storage device 1003, so that the destination storage device 1003 ends the skip journal mode, clears the last flushed LBA recorded, and changes the session state to the full IN_SYNC. In some embodiments, I/O requests of the QUERY_LAST_FLUSH-ED_LBA type (only with header shell and no page content) can be used for query, and another type of I/O requests END_SKIP_JOURNAL_MODE can be used to finally end the skip mode.

In some embodiments, the end phase should wait for flushing, which may take some additional time. Compared with the huge initial copy cost, the final flushing will wait for at most 100-1000 GB of additional data to be flushed in the destination memory. The waiting time is several minutes at most, and it is negligible compared with the lengthy initial copy time.

In some embodiments, metadata of the known index nodes (inodes) and layouts may change during initial replication or resynchronization at the destination storage device along with size scaling, snapshot updates, and other uncontrolled operations. In some embodiments, in order to prevent loss of metadata during the recovery phase that would change and cause damage to the disk partition, all I/O requests generated inside the destination storage device 1003 must not skip persisting of journal logs on the disk, and only the user data part from the RMD can skip persisting of journal logs on the disk.

Figure 11:
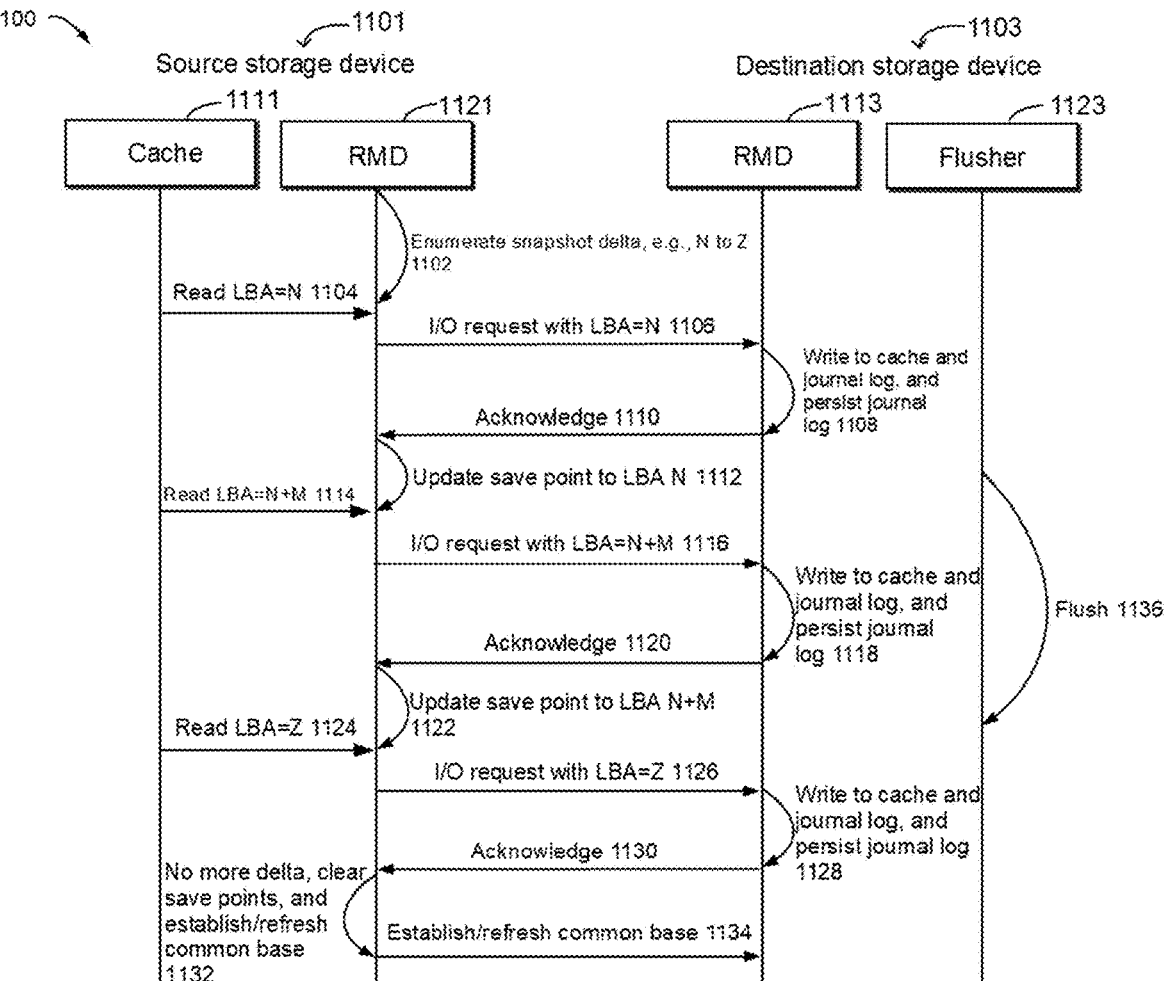
FIG. 11 illustrates a schematic diagram of a data replication process in conventional async replication.
Figure 12:
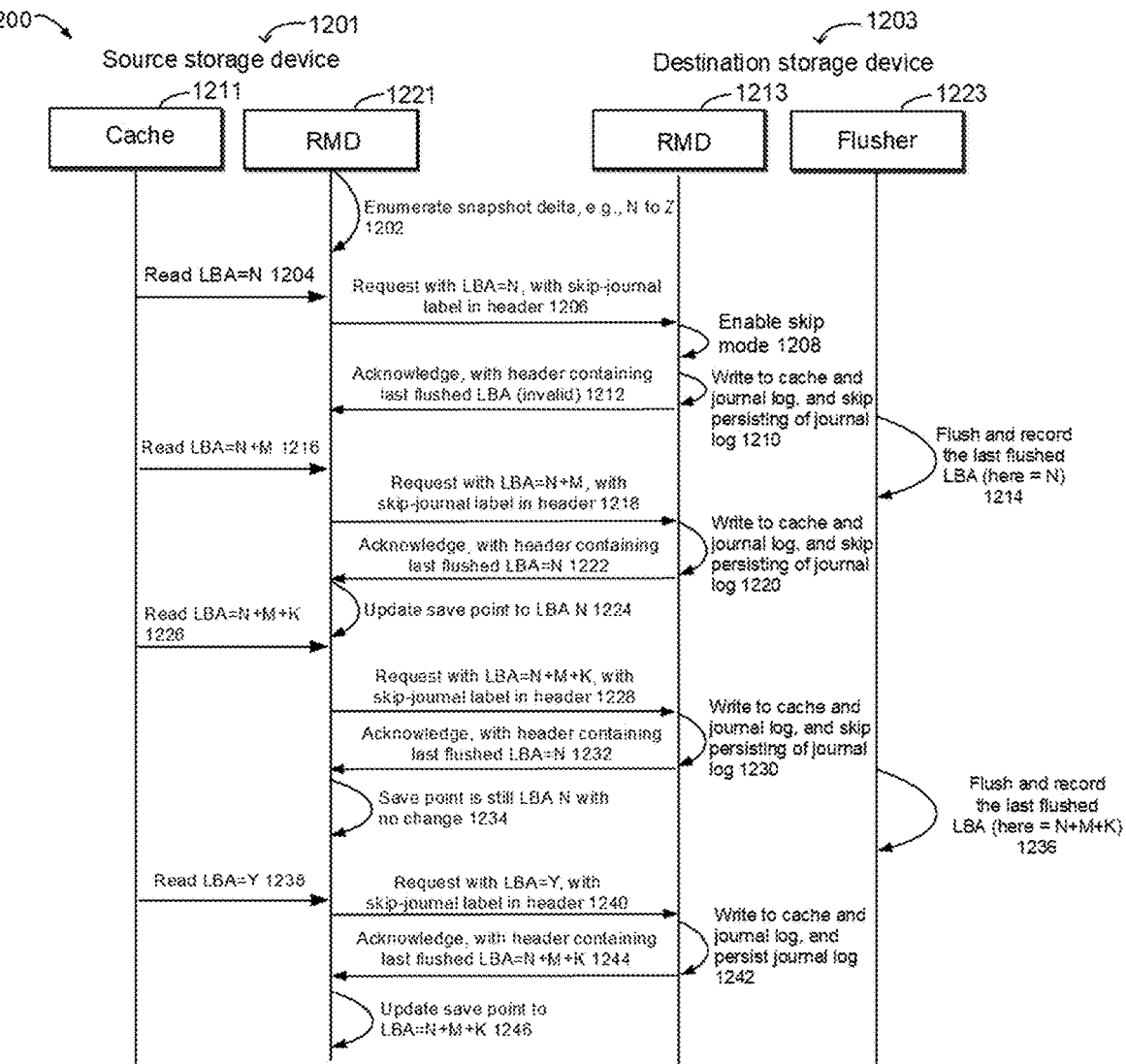
FIG. 12 illustrates a schematic diagram of a data replication process in async replication of a plurality of embodiments of the present disclosure.
Figure 13:
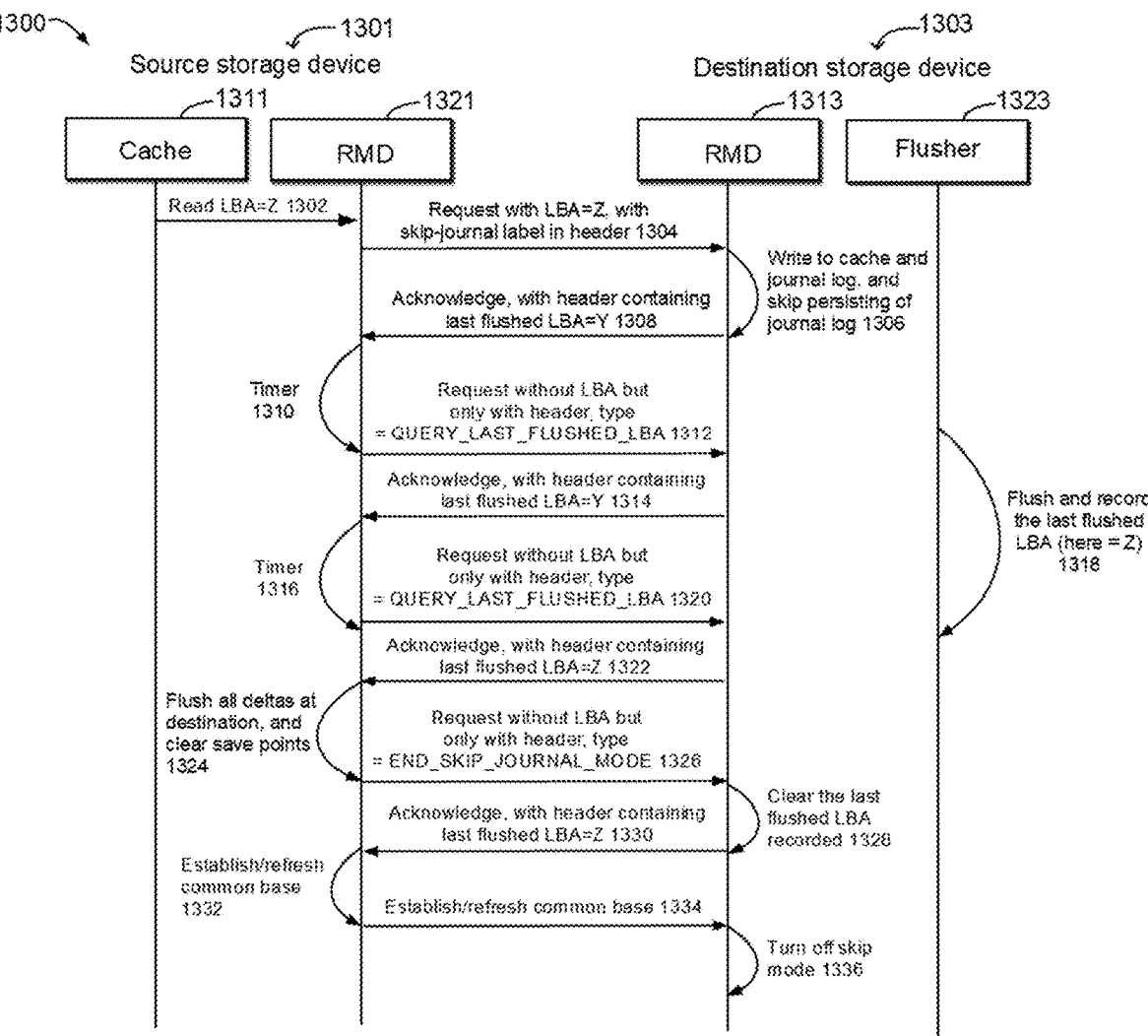
FIG. 13 illustrates a schematic diagram of an end phase of a data replication process in async replication of a plurality of embodiments of the present disclosure.

Hereinafter, with reference to FIGS. 11-13, the data replication process in the conventional async replication is compared with the data replication process in the async replication according to a plurality of embodiments of the present disclosure. The data replication processes in FIGS. 11-13 are applicable to async replication of the third scenario and the fourth scenario. For case of illustration, only the cache and the RMD in the source storage device and the RMD and the flusher in the destination storage device are shown in the following accompanying drawings.

At the destination storage device in the snapshot-based async replication, I/O requests always come from the cache/ disk in the source storage device rather than directly from the host. In the initial async copy phase, data is transferred from small LBAs to large LBAs in a sequential manner. Note that during the initial copy or delta copy, host I/O requests newly arriving at the source storage device will accumulate to a new snapshot, which does not affect transfer of the delta at all. Unlike the fracture log used in sync replication, async replication uses save points to record the last transmitted LBA. If the destination storage device is restarted, the source storage device continues to retransmit snapshots from the last save point.

FIG. 11 illustrates a schematic diagram of a data replication process 1100 in conventional async replication. In the replication process 1100, at 1102, in a source storage device 1101, a snapshot delta is enumerated, for example, N→Z; at 1104, an RMD 1121 of the source storage device 1101 reads LBA=N from a cache 1111; at 1106, an I/O request with LBA=N is transmitted from the RMD 1121 of the source storage device 1101 to an RMD 1113 of a destination storage device 1103; at 1108, in the destination storage device 1103, the I/O request with LBA=N is written to the cache and the journal log, and the journal log is persisted into the journal log disk; at 1110, an acknowledge message is sent from the destination storage device 1103 to the source storage device 1101, which is used to acknowledge that the data has been stored to the journal log disk of the destination storage device 1103; and at 1112, in the source storage device 1101, the save point is updated to LBA N. At 1114-1122, the processes 1104-1112 continue to be iterated for larger LBA=N+M until the last LBA=Z is read at 1124; at 1126, an I/O request with LBA=Z is transmitted from the source storage device 1101 to the destination storage device 1103; at 1128, in the destination storage device 1103, the I/O request with LBA=N is written to the cache and the journal log, and the journal log is persisted into the journal log disk; at 1130, an acknowledge message is sent from the destination storage device 1103 to the source storage device 1101 to acknowledge that the data in the last I/O request has been persisted into the journal log disk of the destination storage device 1103; then at 1132, in the source storage device 1101, there is no more delta, the save points are cleared, and the common base is established/refreshed to synchronize the source storage device 1101 with the destination storage device 1103; and at 1134, the destination storage device 1103 is notified to establish/refresh the common base. Independent of the above operations, before the acknowledge 1130, at 1136, data is continuously flushed in the background in the flusher 1123 of the destination storage device 1103.

FIG. 12 illustrates a schematic diagram of a data replication process 1200 in async replication according to a plurality of embodiments of the present disclosure. Specifically, FIG. 12 illustrates the data replication process until the I/O request of the penultimate snapshot is transmitted. In the replication process 1200, at 1202, in a source storage device 1201, a snapshot delta is enumerated, for example, N→Z; at 1204, in the source storage device 1201, an RMD 1221 reads LBA=N from a cache 1211; at 1206, an I/O request with LBA=N is transmitted from the RMD 1221 of the source storage device 1201 to an RMD 1213 of a destination storage device 1203, which has a "skip-journal" label in the header thereof; at 1208, in the destination storage device 1203, a skip mode is enabled for a particular disk partition (if the skip mode is disabled); at 1210, in the destination storage device 1203, the I/O request with LBA=N is written to the cache and the journal log, and the persisting of the journal log into the journal log disk is skipped; at 1212, an acknowledge message is sent from the destination storage device 1203 to the source storage device 1201, wherein the header of the acknowledge message contains the last flushed LBA, this LBA being an invalid number since the destination storage device 1203 has not been flushed at this time; at 1214, for the particular disk partition, the flusher 1223 flushes data in the background and records the last flushed LBA (i.e., the particular LBA), where for that disk partition, the last flushed LBA=N; meanwhile, at 1216-1220, in the source storage device 1201, similar to LBA=N, a next set of I/O requests continues to be received, i.e., the next set of LBA=N+M is read and transmitted to the destination storage device 1203 and written to the cache and journal logs in the destination storage device 1203, and the persisting of the journal logs to the journal log disk is skipped; then at 1222, an acknowledge message is sent from the destination storage device 1203 to the source storage device 1201, wherein the header of the acknowledge message contains the last flushed LBA=N (i.e., the particular LBA); at 1224, in the source storage device 1201, the save point is updated to LBA N; at 1226-1234, the previous operations continue to be iterated for LBA=N+M+K; at 1234, in the source storage device 1201, the save point is still LBA N with no change; then at 1236, in the destination storage device 1203, the flusher 1223 flushes and records the last flushed LBA=N+M+K (the updated particular LBA); at 1238-1242, the previous operations continue to be iterated for LBA=Y (which may correspond to an I/O request for the penultimate snapshot delta, for example); and at 1244, an acknowledge message is sent from the destination storage device 1203 to the source storage device 1201, wherein the header of the acknowledge message contains the last flushed LBA=N+M+K (i.e., the updated particular LBA); and at 1246, in the source storage device 1201, the save point is updated to N+M+K.

It should be understood that the solution of snapshot-based async replication may be similar to the solution of sync replication. The inventors can also add a "skip-journal" label to the I/O request of the snapshot difference (or delta) and use a similar end phase.

In some embodiments, in the shortcut solution, the source storage device 1201 maintains the save point until an update of the flushed LBA is received. In some embodiments, the flushed LBA can be transmitted in the header of the acknowledge message I/O_ack or via a notification message.

FIG. 13 illustrates a schematic diagram of an end phase 1300 of a data replication process in async replication of a plurality of embodiments of the present disclosure. Specifically, the end phase 1300 includes from transmitting the last I/O request to establishing or refreshing the common base. In the end phase 1300, LBA Y has been flushed and is recorded as the last flushed LBA. In the end phase 1300, at 1302, in a source storage device 1301, an RMD 1321 reads the last LBA=Z (which may correspond to an I/O request for the last snapshot delta, for example) from a cache 1311; at 1304, an I/O request with LBA=Z is transmitted from the RMD 1321 of the source storage device 1301 to an RMD 1313 of a destination storage device 1303, wherein the header thereof has a "skip-journal" label; at 1306, in the destination storage device 1303, the I/O request with LBA=N is written to the cache and the journal log, and the persisting of the journal log into the journal log disk is skipped; at 1308, an acknowledge message is sent from the destination storage device 1003 to the source storage device 1001, wherein the header of the acknowledge message contains the last flushed LBA=Y; at 1310, a timer is experienced in the source storage device 1301, wherein the timer is used to query in the destination storage device 1303 whether the LBA=Z of a last I/O request from the source storage device 1301 was flushed at the flusher 1323; at 1312, another type of request QUERY_LAST_FLUSHED_LBA is sent from the source storage device 1301 to the destination storage device 1303, which is used to query whether the LBA=Z of the last I/O request was flushed at the flusher 1323; at 1314, an acknowledge message is sent from the destination storage device 1303 to the source storage device 1301, wherein the header of the acknowledge message contains the last flushed LBA=Y, at which point the last LBA=Z has not been flushed; at 1316, the timer is experienced again in the source storage device 1301; at 1318, another type of request QUERY_LAST_FLUSHED_LBA is sent again by the source storage device 1301 to the destination storage device 1303, which is used to query whether the LBA=Z of the last I/O request was flushed at the flusher 1323; at 1320, the flusher 1323 flushes and records the last flushed LBA=Z, which means that the data in the last I/O request has been flushed; at 1322, an acknowledge message is sent from the destination storage device 1303 to the source storage device 1301, wherein the header of the acknowledge message contains the last flushed LBA=Z, which means that the last LBA=Z has been flushed; at 1324, in the source storage device 1301, all deltas are flushed at the destination and the save points are cleared; at 1326, another type of request END_SKIP_JOURNAL_MODE is sent from the source storage device 1301 to the destination storage device 1303, which is used to cause the destination storage device 1303 to exit the skip mode; at 1328, the last flushed LBA recorded is cleared in the destination storage device 1303, which means that all particular LBAs are cleared; at 1330, an acknowledge message is sent from the destination storage device 1303 to the source storage device 1301, wherein any header of the acknowledge message contains the last flushed LBA=Z; at 1332, in the source storage device 1301, the common base is established/refreshed; at 1334, the source storage device 1301 notifies the destination storage device 1303 to establish/refresh the common base; and at 1336, in the destination storage device 1303, the skip mode is turned off.

In some embodiments, metadata of the known index nodes (inodes) and layouts may change during initial replication or resynchronization at the destination storage device along with size scaling, snapshot updates, and other uncontrolled operations. In some embodiments, in order to prevent loss of metadata during the recovery phase that would change and cause damage to the disk partition, all I/O requests generated inside the destination storage device 1003 must not skip persisting of journal logs on the disk, and only the user data part from the RMD can skip persisting of journal logs on the disk.

Various embodiments of the present disclosure can provide the following advantages compared with conventional methods that do not consider the lower deck journal logs at all. For example, in various embodiments of the present disclosure, in the destination storage device, the data in the I/O requests can be kept from being written to and cleared from the journal log disk, which can accelerate the original data replication by 30%-40% under a high-bandwidth replication network (such as fiber channels), thereby making it possible to reduce the time spent on replicating data from the source storage device to the destination storage device to improve the user experience, and at the same time, making it possible to reduce the CPU and I/O consumption at the destination storage device, and also to reduce the wear and tear of the journal log disk in the destination storage device to prolong its service life.

Figure 14:
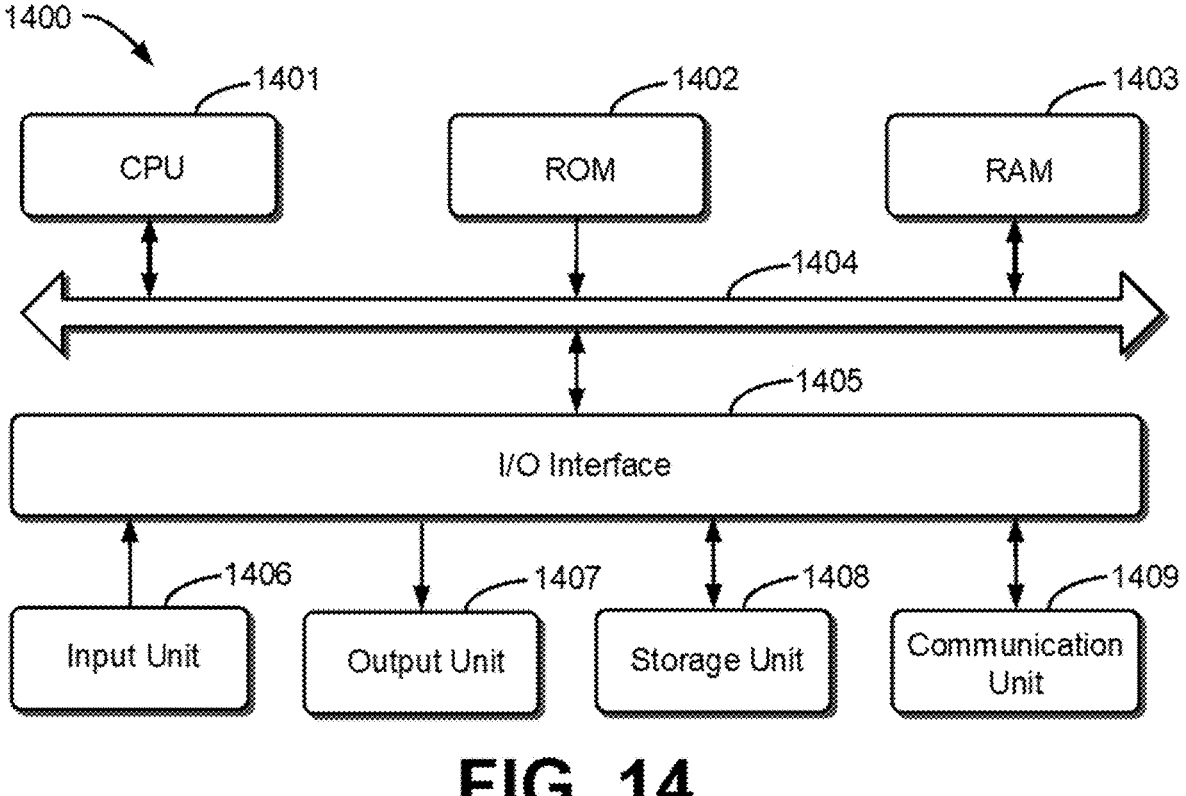
FIG. 14 illustrates a block diagram of a device that can implement a plurality of embodiments of the present disclosure.

FIG. 14 illustrates a schematic block diagram of an example device 1400 which can be used to implement embodiments of the present disclosure. As shown in the figure, the device 1400 includes a computing unit 1401 that may perform various appropriate actions and processing according to computer program instructions stored in a read-only memory (ROM) 1402 or computer program instructions loaded from a storage unit 1408 to a random access memory (RAM) 1403. In RAM 1403, various programs and data required for the operation of storage device 1400 may also be stored. The computing unit 1401, the ROM 1402, and the RAM 1403 are connected to one another through a bus 1404. An input/output (I/O) interface 1405 is also connected to the bus 1404.

A plurality of components in the device 1400 are connected to the I/O interface 1405, including: an input unit 1406, such as a keyboard and a mouse; an output unit 1407, such as various types of displays and speakers; the storage unit 1408, such as a magnetic disk and an optical disc; and a communication unit 1409, such as a network card, a modem, and a wireless communication transceiver. The communication unit 1409 allows the device 1400 to exchange information/data with other devices via a computer network, such as the Internet, and/or various telecommunication networks.

The computing unit 1401 may be various general-purpose and/or special-purpose processing components with processing and computing capabilities. Some examples of the computing unit 1401 include, but are not limited to, central processing units (CPUs), graphics processing units (GPUs), various specialized artificial intelligence (AI) computing chips, various computing units for running machine learning model algorithms, digital signal processors (DSPs), and any appropriate processors, controllers, microcontrollers, etc. The computing unit 1401 performs various methods and processing described above, for example, the methods 500, 600, and 700. For example, in some embodiments, the methods 500, 600, and 700 may be implemented as a computer software program that is tangibly included in a machine-readable medium, for example, the storage unit 1408. In some embodiments, part or all of the computer program may be loaded and/or installed onto the device 1400 via the ROM 1402 and/or the communication unit 1409. When the computer program is loaded to the RAM 1403 and executed by the computing unit 1401, one or more steps of the methods 500, 600, and 700 described above may be performed. Alternatively, in other embodiments, the computing unit 1401 may be configured to implement the methods 500, 600, and 700 in any other suitable manners (such as by means of firmware).

The functions described herein above may be executed at least in part by one or more hardware logic components. For example, without limitation, example types of available hardware logic components include: a Field Programmable Gate Array (FPGA), an Application Specific Integrated Circuit (ASIC), an Application Specific Standard Product (ASSP), a System on Chip (SOC), a Load Programmable Logic Device (CPLD), and the like.

Program code for implementing the method of the present disclosure may be written by using one programming language or any combination of a plurality of programming languages. The program code may be provided to a processor or controller of a general purpose computer, a special purpose computer, or another programmable data processing apparatus, such that the program code, when executed by the processor or controller, implements the functions/operations specified in the flow charts and/or block diagrams. The program code may be executed completely on a machine, executed partially on a machine, executed partially on a machine and partially on a remote machine as a stand-alone software package, or executed completely on a remote machine or server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable storage medium may include one or more wire-based electrical connections, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combinations thereof. Additionally, although operations are depicted in a particular order, this should be understood that such operations are required to be performed in the particular order shown or in a sequential order, or that all illustrated operations should be performed to achieve desirable results. Under certain environments, multitasking and parallel processing may be advantageous. Likewise, although the above discussion contains several specific implementation details, these should not be construed as limitations to the scope of the present disclosure. Certain features that are described in the context of separate embodiments may also be implemented in combination in a single implementation. Conversely, various features that are described in the context of a single implementation may also be implemented in a plurality of implementations separately or in any suitable sub-combination.

Although the present subject matter has been described using a language specific to structural features and/or method logical actions, it should be understood that the subject matter defined in the appended claims is not necessarily limited to the particular features or actions described above. Rather, the specific features and actions described above are merely example forms of implementing the claims.

The invention claimed is:

1. A method for replicating data, comprising:
   receiving, by a destination storage device, a first set of input/output (I/O) requests from a source storage device, the first set of I/O requests having a first set of logical block addresses (LBAs);
   writing data in the first set of I/O requests to a cache of the destination storage device;

22 flushing the data from the cache to a storage disk of the destination storage device;
   recording a particular LBA in the destination storage device, the particular LBA corresponding to the last LBA to which the destination storage device is flushed;
   sending the particular LBA from the destination storage device to the source storage device to enable clearing of journals before the particular LBA in the source storage device; and
   enabling a skip mode in the destination storage device before receiving the first set of I/O requests from the source storage device, wherein in the skip mode, the first set of I/O requests are not written to a journal log disk of the destination storage device.

2. The method according to claim 1, further comprising:
   exiting the skip mode in the destination storage device in response to all journals in the source storage device being cleared, wherein the particular LBA recorded in the destination storage device is cleared and the source storage device is set to be in synchronization with the destination storage device.

3. The method according to claim 2, further comprising:
   setting a timer in the source storage device, wherein the timer is used to query in the destination storage device whether an LBA of a last I/O request from the source storage device is equal to the particular LBA, and all journals in the source storage device are cleared in the case where the LBA of the last I/O request is found to be equal to the particular LBA.

4. The method according to claim 2, wherein the synchronization comprises any one of:
   for sync replication, changing a session state to an IN_SYNC state; and
   for async replication, establishing or refreshing a common base.

5. The method according to claim 1, wherein enabling a skip mode in the destination storage device comprises:
   enabling the skip mode independently for different disk partitions in the destination storage device.

6. The method according to claim 1, further comprising:
   receiving, by the destination storage device, a second set of I/O requests from the source storage device, the second set of I/O requests having a second set of LBAs;
   writing data in the second set of I/O requests to the cache of the destination storage device;
   flushing the data in the second set of I/O requests from the cache to the storage disk of the destination storage device;
   updating a recorded second particular LBA in the destination storage device according to the second set of LBAs; and
   sending the updated second particular LBA from the destination storage device to the source storage device to enable clearing of journals before the updated particular LBA in the source storage device.

7. The method according to claim 6, further comprising:
   receiving a third set of I/O requests after clearing of the journals before the particular LBA in the source storage device and before receiving the second set of I/O requests from the source storage device, the third set of I/O requests having a third set of LBAs, wherein the third set of LBAs is between the first set of LBAs and the second set of LBAs.

8. The method according to claim 1, wherein sending the particular LBA from the destination storage device to the source storage device comprises at least one of:

sending the particular LBA from the destination storage device to the source storage device by including the particular LBA in a header of an acknowledge message sent from the destination storage device to the source storage device; and sending the particular LBA from the destination storage device to the source storage device by sending a notification message indicating the particular LBA.

9. The method according to claim 1, wherein clearing of journals before the particular LBA in the source storage device comprises:

for sync replication, clearing fracture logs before the particular LBA in the source storage device.

10. The method according to claim 1, wherein clearing of journals before the particular LBA in the source storage device comprises:

for async replication, updating a save point to the particular LBA in the source storage device.

11. The method according to claim 1, wherein clearing of journals before the particular LBA in the source storage device comprises any one of:

for sync replication, clearing fracture logs before the particular LBA in the source storage device; and for async replication, updating a save point to the particular LBA in the source storage device.

12. The method according to claim 1, further comprising:

performing "skip-journal" label detection operations to determine whether the I/O requests of the first set of I/O requests are tagged with a "skip-journal" label.

13. The method according to claim 12, further comprising:

in response to the "skip-journal" label detection operations indicating that the I/O requests of the first set of I/O requests are tagged with the "skip-journal" label, preventing performance of persisting operations that would persist the I/O requests of the first set of I/O requests into the journal log disk of the destination storage device.

14. An electronic device, comprising:

at least one processor; and a storage apparatus coupled to the at least one processor and having instructions stored thereon, wherein the instructions, when executed by the at least one processor, cause the electronic device to perform actions comprising:

receiving, by a destination storage device, a first set of input/output (I/O) requests from a source storage device, the first set of I/O requests having a first set of logical block addresses (LBAs);

writing data in the first set of I/O requests to a cache of the destination storage device;

flushing the data from the cache to a storage disk of the destination storage device;

recording a particular LBA in the destination storage device, the particular LBA corresponding to the last LBA to which the destination storage device is flushed;

sending the particular LBA from the destination storage device to the source storage device to enable clearing of journals before the particular LBA in the source storage device; and enabling a skip mode in the destination storage device before receiving the first set of I/O requests from the source storage device, wherein in the skip mode, the first set of I/O requests are not written to a journal disk of the destination storage device.

15. The electronic device according to claim 14, further comprising:

exiting the skip mode in the destination storage device in response to all journals in the source storage device being cleared, wherein the particular LBA recorded in the destination storage device is cleared and the source storage device is set to be in synchronization with the destination storage device.

16. The electronic device according to claim 15, wherein the actions further comprise:

setting a timer in the source storage device, wherein the timer is used to query in the destination storage device whether an LBA of a last I/O request from the source storage device is equal to the particular LBA, and all journals in the source storage device are cleared in the case where the LBA of the last I/O request is found to be equal to the particular LBA.

17. The electronic device according to claim 14, further comprising:

receiving, by the destination storage device, a second set of I/O requests from the source storage device, the second set of I/O requests having a second set of LBAs;

writing data in the second set of I/O requests to the cache of the destination storage device;

flushing the data in the second set of I/O requests from the cache to the storage disk of the destination storage device;

updating a recorded second particular LBA in the destination storage device according to the second set of LBAs; and sending the updated second particular LBA from the destination storage device to the source storage device to enable clearing of journals before the updated particular LBA in the source storage device.

18. The electronic device according to claim 17, further comprising:

receiving a third set of I/O requests after clearing of the journals before the particular LBA in the source storage device and before receiving the second set of I/O requests from the source storage device, the third set of I/O requests having a third set of LBAs, wherein the third set of LBAs is between the first set of LBAs and the second set of LBAs.

19. The electronic device according to claim 14, wherein sending the particular LBA from the destination storage device to the source storage device comprises at least one of:

sending the particular LBA from the destination storage device to the source storage device by including the particular LBA in a header of an acknowledge message sent from the destination storage device to the source storage device; and sending the particular LBA from the destination storage device to the source storage device by sending a notification message indicating the particular LBA.

20. A computer program product having a non-transitory computer readable medium which stores a set of instructions to replicate data; the set of instructions, when carried out by computerized circuitry, causing the computerized circuitry to perform a method of:

receiving, by a destination storage device, a first set of input/output (I/O) requests from a source storage device, the first set of I/O requests having a first set of logical block addresses (LBAs);

writing data in the first set of I/O requests to a cache of the destination storage device;

flushing the data from the cache to a storage disk of the destination storage device;

recording a particular LBA in the destination storage device, the particular LBA corresponding to the last LBA to which the destination storage device is flushed;

sending the particular LBA from the destination storage device to the source storage device to enable clearing of journals before the particular LBA in the source storage device; and enabling a skip mode in the destination storage device before receiving the first set of I/O requests from the source storage device, wherein in the skip mode, the first set of I/O requests are not written to a journal log disk of the destination storage device.

* * * * *